United States Patent
Nishi et al.

(10) Patent No.: US 7,774,567 B2
(45) Date of Patent: Aug. 10, 2010

(54) COPY CONTROL METHOD AND A STORAGE DEVICE

(75) Inventors: Yoshiyuki Nishi, Fujisawa (JP);
Nobuhiro Maki, Yokohama (JP);
Kenichi Oyamada, Yokohama (JP);
Kazuhiko Watanabe, Yokohama (JP);
Hiroshi Yamamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 772 days.

(21) Appl. No.: 11/698,866

(22) Filed: Jan. 29, 2007

(65) Prior Publication Data

US 2008/0120352 A1    May 22, 2008

(30) Foreign Application Priority Data

Nov. 20, 2006    (JP)    .............................. 2006-313411

(51) Int. Cl.
*G06F 12/16* (2006.01)

(52) U.S. Cl. ........................................ 711/162; 711/167

(58) Field of Classification Search .................. None
See application file for complete search history.

(56) References Cited

U.S. PATENT DOCUMENTS

| 7,111,136 | B2 | 9/2006 | Yamagami |
| 7,512,643 | B2 * | 3/2009 | Kobayashi et al. .......... 707/204 |

FOREIGN PATENT DOCUMENTS

JP    2006-155676    6/2006

* cited by examiner

*Primary Examiner*—Gary J Portka
(74) *Attorney, Agent, or Firm*—Antonelli, Terry, Stout & Kraus, LLP.

(57) ABSTRACT

In a copy control method, during a process for the acquisition of a data copy at a designated time, a recovery period of time can still be reduced when an input/output request is issued for copy source data at the designated time. For a system that includes a first storage device in which data are stored, a second storage device that obtains a data copy, and a host computer that writes data to the first storage device, the second storage device obtains blank input/output requests that are issued at predetermined time intervals if the host computer does not generate an input/output request for the first storage device, and the second storage device determines that a time closest to a predetermined data copy acquisition time, which is a target time for the acquisition of a data copy, is a copy execution time for the acquisition of a data copy.

18 Claims, 37 Drawing Sheets

FIG. 7

| # | UPDATE TIME | UPDATE LOCATION | UPDATED DATA | REMARKS |
|---|---|---|---|---|
| 1 | 2006/07/20 23:50:00 | — | — | BLANK I/O |
| 2 | 2006/07/20 23:50:12 | CCHHRR | X' llxxxxxxxxxx' | |

| # | TYPE | TIME |
|---|---|---|
| 1 | DATA COPY START TIME | 2006/07/20 23:50:12 |
| 2 | DATA COPY ACQUISITION TIME | 2006/07/21 00:00:00 |
| 3 | DATA COPY END TIME | 2006/07/21 00:59:59 |
| 4 | BLANK I/O ISSUANCE INTERVAL | 30 SECONDS |
| 5 | JOB BREAK PERIOD | 5 MINUTES |

| # | CATEGORY | VALUE |
|---|---|---|
| 1 | DATA COPY START TIME | 2006/07/20 23:50:00 |
| 2 | DATA COPY ACQUISITION TIME | 2006/07/21 00:00:00 |
| 3 | DATA COPY END TIME | 2006/07/21 00:59:59 |
| 4 | BLANK I/O ISSUANCE INTERVAL | 30 SECONDS |
| 5 | JOB BREAK PERIOD | 5 MINUTES |
| 6 | DATA COPY STATUS | WAITING / PROCESSING / COMPLETION / FORCED COMPLETION / FAILURE |
| 7 | DATA COPY EXECUTION TIME | 2006/07/21 00:00:00 (EFFECTIVE WHEN DATA COPY STATUS INDICATES COMPLETION OR FORCED COMPLETION) |
| 8 | REPETITIVE BLANK I/O ACQUISITION COUNT | (WORK AREA) |
| 9 | TEMPORARY DATA COPY EXECUTION TIME | (WORK AREA) |

811 — row 1
812 — row 2
813 — row 3
814 — row 4
815 — row 5
816 — row 6
817 — row 7
818 — row 8
819 — row 9

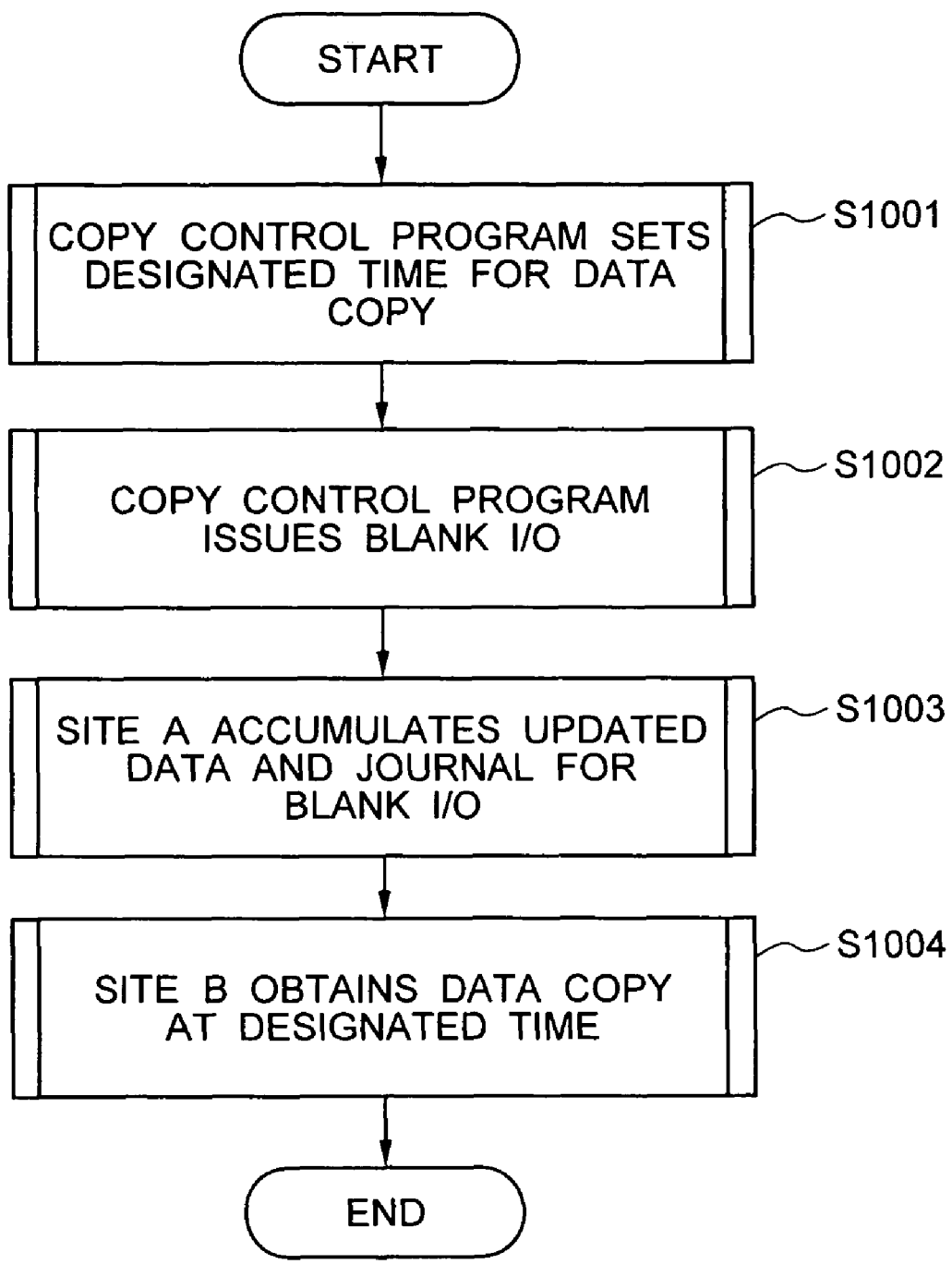

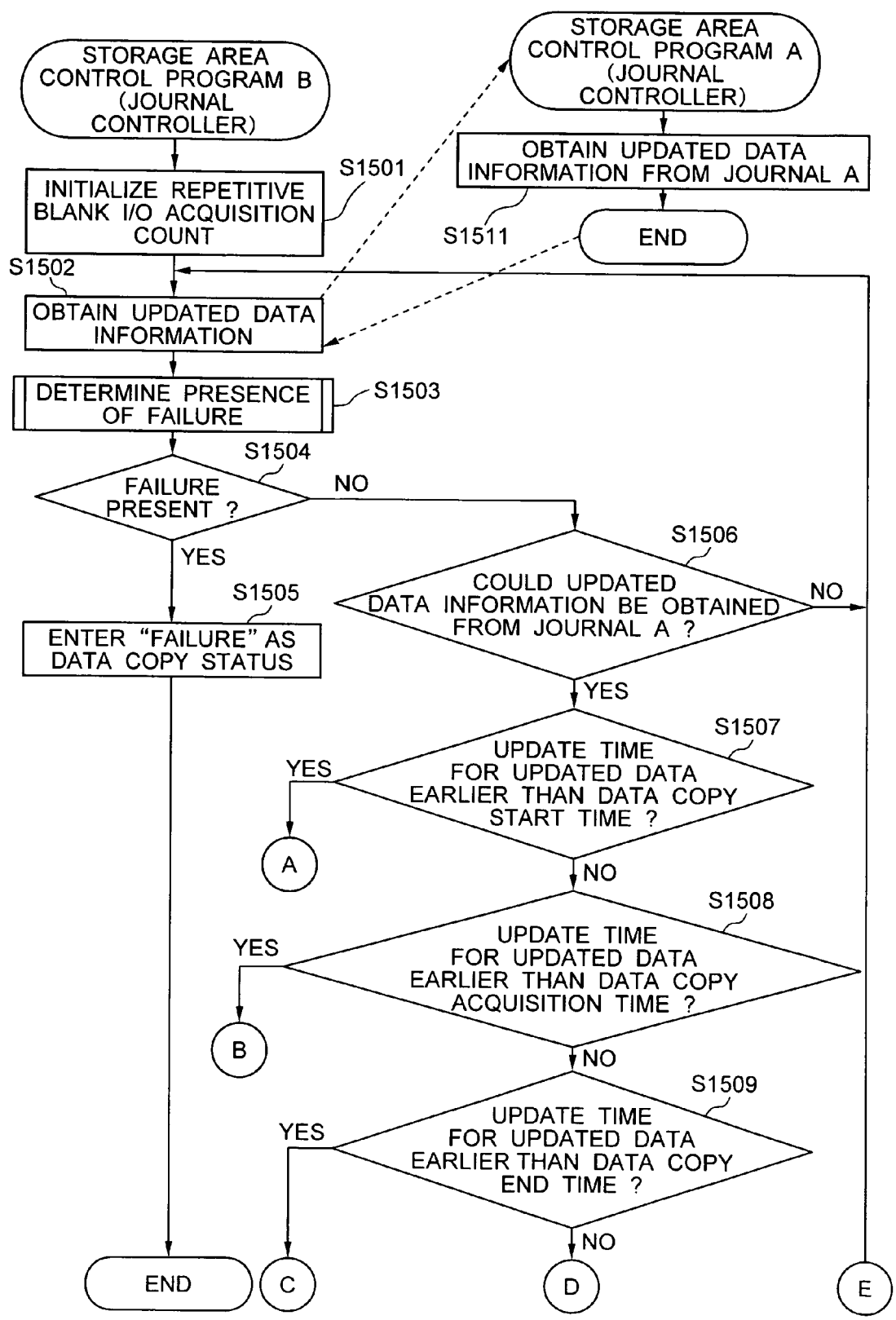

FIG. 18A
| DATA COPY START TIME | 11:50 |
|---|---|
| DATA COPY ACQUISITION TIME | 12:00 |
| DATA COPY END TIME | 12:20 |
FIG. 18B
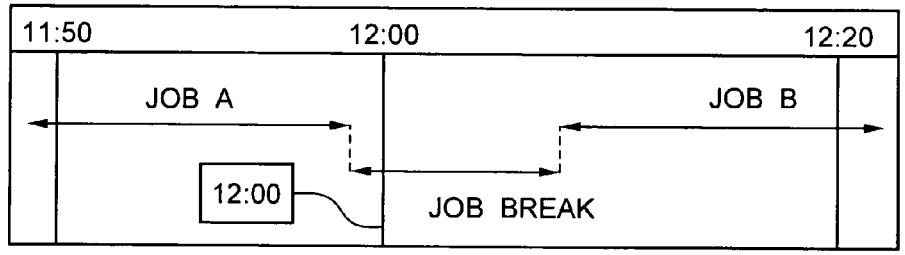
FIG. 18C
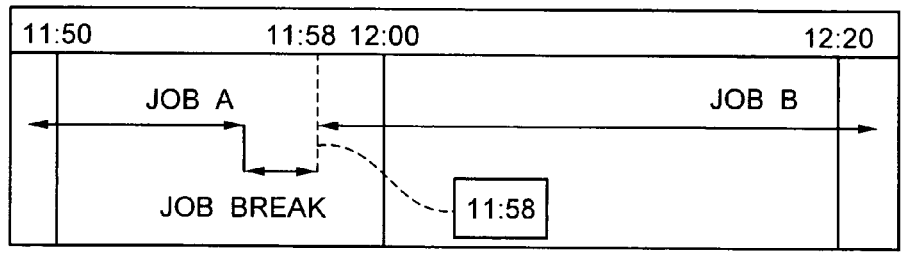
FIG. 18D
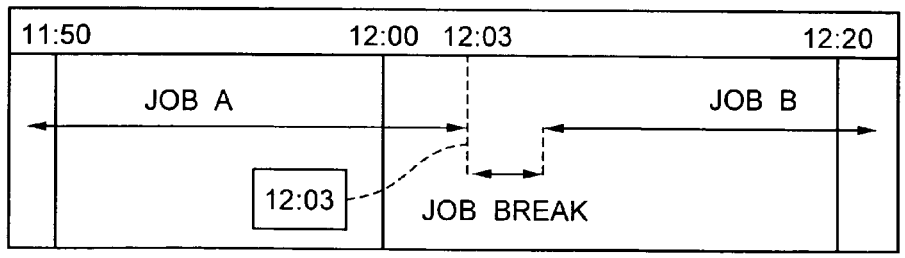
FIG. 18E
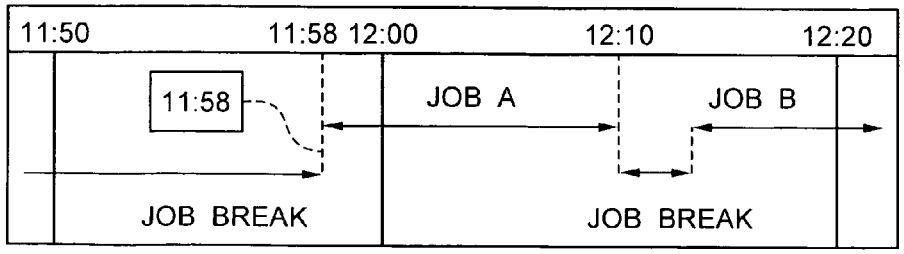

| # | UPDATE LOCATION | UPDATED DATA | REMARKS |
|---|---|---|---|
| | 2301 | 2302 | |
| 1 | CCHHRR | X' llxxxxxxxxxx' | |

| # | TYPE | TIME |
|---|---|---|
| 1 | DATA COPY START TIME | 2006/07/20 23:50:00 |
| 2 | DATA COPY ACQUISITION TIME | 2006/07/21 00:00:00 |
| 3 | DATA COPY END TIME | 2006/07/21 00:59:59 |
| 4 | BLANK I/O ISSUANCE INTERVAL | 30 SECONDS |
| 5 | JOB BREAK PERIOD | 5 MINUTES |

| # | CATEGORY | VALUE |
|---|---|---|
| 1 | DATA COPY START TIME | 2006/07/20 23:50:00 |
| 2 | DATA COPY ACQUISITION TIME | 2006/07/21 00:00:00 |
| 3 | DATA COPY END TIME | 2006/07/21 00:59:59 |
| 4 | BLANK I/O ISSUANCE INTERVAL | 30 SECONDS |
| 5 | JOB BREAK PERIOD | 5 MINUTES |

| # | UPDATE TIME | UPDATE LOCATION | UPDATED DATA | REMARKS |
|---|---|---|---|---|
| 1 | 2006/07/20 23:50:00 | — | — | BLANK I/O |
| 2 | 2006/07/20 23:50:12 | CCHHRR | X'IIxxxxxxxxxx' | |

| # | CATEGORY | VALUE |
|---|---|---|
| 1 | DATA COPY START TIME | 2006/07/20 23:50:00 |
| 2 | DATA COPY ACQUISITION TIME | 2006/07/21 00:00:00 |
| 3 | DATA COPY END TIME | 2006/07/21 00:59:59 |
| 4 | BLANK I/O ISSUANCE INTERVAL | 30 SECONDS |
| 5 | JOB BREAK PERIOD | 5 MINUTES |
| 6 | DATA COPY STATUS | WAITING / PROCESSING / COMPLETION / FORCED COMPLETION / FAILURE |
| 7 | DATA COPY EXECUTION TIME | 2006/07/21 00:00:00 (EFFECTIVE WHEN DATA COPY STATUS INDICATES COMPLETION OR FORCED COMPLETION) |
| 8 | REPETITIVE BLANK I/O ACQUISITION COUNT | (WORK AREA) |
| 9 | TEMPORARY DATA COPY EXECUTION TIME | (WORK AREA) |

2711, 2712, 2713, 2714, 2715, 2716, 2717, 2718, 2719

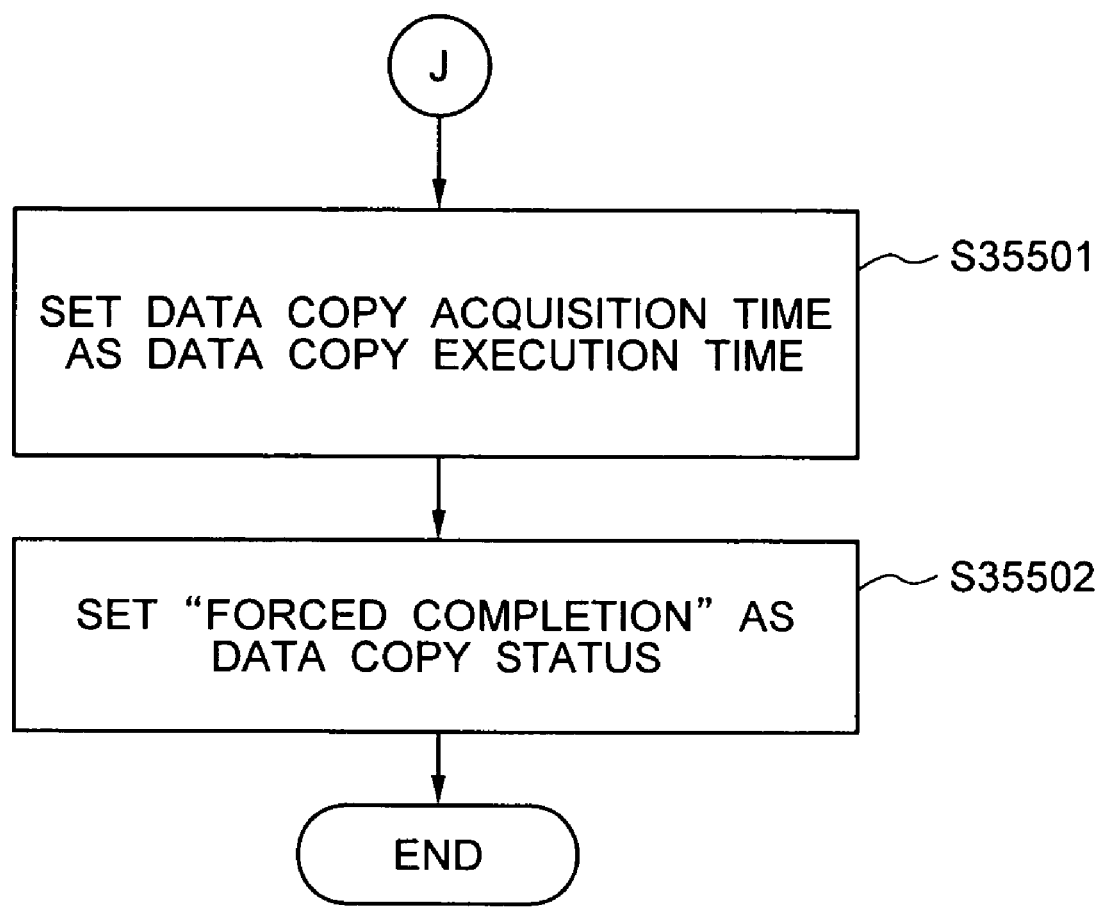

COPY CONTROL METHOD AND A STORAGE DEVICE

INCORPORATION BY REFERENCE

The present application claims priority from Japanese application JP2006-313411 filed on Nov. 20, 2006, the content of which is hereby incorporated by reference into this application.

BACKGROUND OF THE INVENTION

The present invention relates to a data copy technique for data held in a computer system. The present invention relates particularly to a copy control method for adjusting a designated, data copy acquisition time and for calculating an optimal acquisition time, and a storage device therefor.

Conventionally, a variety of methods have been developed that provide for the backing up of data, held in a computer system, at a designated time during which the job performance loads are not concentrated.

For example, as a method for the copying of data at a selected time, a method and an apparatus for backing up a database at a designated time are disclosed in JP-A-2006-155676. According to this method and apparatus, a batch process is performed without halting the updating of a database that is currently being employed by an online system.

Further, as another backup example, a CDP (Continuous Data Protection) technique is disclosed in U.S. Pat. No. 7,111,136. According to this technique, data written in primary storage are tracked and capture processes are performed constantly, not just at designated times, and changed portions are written in secondary storage as members of a timed series. Thus, beginning at a specific time in the past, data written at arbitrary times can be reproduced.

SUMMARY OF THE INVENTION

By using the method and apparatus for backing up data at a designated time, as disclosed in JP-A-2006-155676, a data backup can be obtained at a designated time, regardless of whether a job is currently being performed.

However, this data backup method can not be employed for a program that is engaged in performing an operation, since no data can be backed up until the job has been completed. Therefore, data must be obtained after the updating and before the updating (for a so-called journal) and a backup performed at an arbitrarily designated time must be recovered. In this case, as the data quantities before and after updating, which are required for restoration, are increased, it would take more time for a recovery. Further, when a failure has been encountered at a designated time, a backup at an existing copy designation would be overwritten.

By using the method and the apparatus disclosed in U.S. Pat. No. 7,111,136 to perform a backup and a recovery using storage based journaling, data at an arbitrary time following a specific time in the past can be reproduced.

However, as in the technique described in JP-A-2006-155676, since a journal is required for recovery, as the number of journals required for a recovery is increased, more time is required for a recovery.

Therefore, an object of the present invention is to provide a method that can still reduce the period of time required for a recovery in a case wherein, when a copy of data is to be obtained at a designated time, an input/output request for copy source data is generated at the time designated.

To achieve this object, according to the present invention, a copy control method, for a system that includes a first storage device, in which data are stored, a second storage device, for obtaining copies of the data, and a host, for writing the data to the first storage device, comprises the steps of:

when the host does not issue an input/output request to a first disk drive, the second storage device obtaining a blank input/output request issued at a predetermined time interval; and among those times at which the blank input/output request was sequentially obtained for a predetermined period of time, the second storage device selecting a time, nearest a predetermined data copy acquisition time, that is a target time for the acquisition of a data copy, and determining the time to be a copy execution time for the acquisition of the data copy.

Other aspects of the invention will be presented in detail during the description of the following embodiments.

According to the invention, when the input/output of copy source data occurs at a designated time (a data copy acquisition time) at which a copy of data is to be obtained, the data are procured while the input/output request is avoided. Therefore, the period for the recovery of the data copy can be reduced.

Other objects, features and advantages of the invention will become apparent from the following description of the embodiments of the invention taken in conjunction with the accompanying drawings.

BRIEF DESCRIPTION OF THE DRAWINGS

FIG. 7 is a table showing sets of information entered as updated data information;

FIG. 8 is a table showing sets of information entered as data copy instruction information;

FIG. 9 is a diagram showing sets of information entered in a data copy management table;

FIG. 10 is a flowchart showing an overview of the processing performed to acquire a data copy at a designated time;

FIG. 15A is a flowchart showing a process for the acquisition of a data copy at a designated time;

FIG. 18A is a table showing setup values for a data copy start time, a data copy acquisition time and a data copy end time;

FIG. 18B is a diagram for explaining an example for the setting of an optimal data copy execution time;

FIG. 18C is a diagram for explaining another example for the setting of an optimal data copy execution time;

FIG. 18D is a diagram for explaining an additional example for the setting of an optimal data copy execution time;

FIG. 18E is a diagram for explaining a further example for the setting of an optimal data copy execution time;

FIG. 29 is a diagram showing sets of information data entered in a copy management table B;

FIG. 35F is a flowchart showing the process for the acquisition of a data copy at a designated time;

DESCRIPTION OF THE EMBODIMENTS

The preferred embodiments of the present invention will now be described in detail while referring to the accompanying drawings. For this invention, two embodiments are employed to explain a storage area control method, and a storage area control system, whereby the end of an I/O (an Input/Output) request for a first disk drive is detected before and after a designated time at which a backup, for the first disk drive, is to be acquired, and in accordance with the timing for this detection, a back up process is performed for a second disk drive.

First Embodiment

System Configuration

Figure 1:
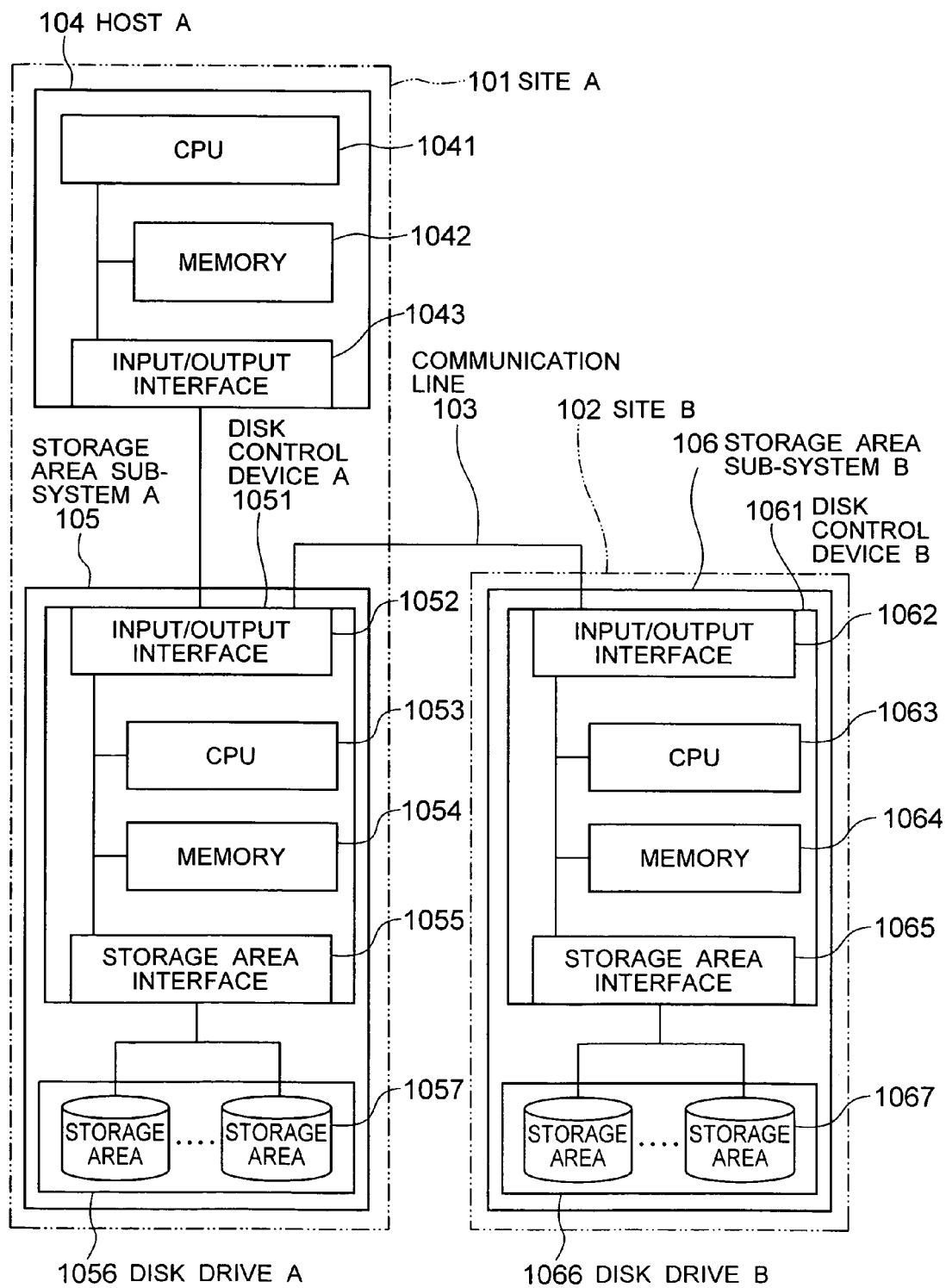
FIG. 1 is a block diagram showing the configuration of a storage area control system according to a first embodiment of the present invention.

FIG. 1 is a block diagram showing the configuration of a storage area control system according to a first embodiment of the present invention. As shown in FIG. 1, the storage area control system of this embodiment comprises: a host A 104, at a site A 101; a storage area subsystem A 105, which includes a disk control device A 1051 and a disk drive A 1056 that are connected to the host A 104; and a storage area subsystem B 106, of a site B 102 that includes a disk control device B 1061 and a disk drive B 1066.

The disk control device A 1051, of the site A 101, and the disk control device B 1061, of the site B 102, are connected by a communication line 103, such as a LAN (a Local Area Network) or a SAN (a Storage Area Network), that enables the rapid transmission/reception of data.

Since the disk control device A 1051, of the site A 101, and the disk control device B 1061, of the site B 102, are connected by the communication line 103, a copy of the disk drive A 1056, of the site A 101, can be prepared at the site B 102.

In this embodiment, the site A 101 and the site B 102 are provided as different sites; however, these two may be consolidated at the same site.

The individual components of the storage area control system will now be explained.

The host A 104 issues, to the disk control device A 1051, an input/output request for data to be stored on the disk drive A 1056. Upon receiving the input/output request, the disk control device A 1051 reads data from, or writes data to, the disk drive A 1056. The host A 104 is a computer that includes a CPU (Central Processing Unit) 1041, a memory 1042 and an input/output interface 1043. In accordance with the intended purpose, the CPU 104 executes a program stored in the memory 1042. The memory 1042 is used to store a program, executed by the host A 104, and data, and the input/output interface 1043 exchanges data with the disk control device A 1051.

Detailed explanation will be given later for the program stored in the memory 1042 of the host A 104.

The disk control device A 1051 includes an input/output interface 1052, a CPU 1053, a memory 1054 and a storage area interface 1055.

The input/output interface 1052 exchanges data with the host A 104, and exchanges data with the disk control device B 1061. The CPU 1053 executes a program stored in the memory 1054, and the memory 1054 is used to store a program, employed by the disk control device A 1051, and data. Further, the storage area interface 1055 exchanges data with the disk drive A 1056.

Detailed explanation will be given later for the program stored in the memory 1042 of the disk control device A 1051.

The disk drive A 1056 is a secondary storage device formed of a plurality of storage areas 1057, and can be provided by using various types of storage devices, such as a hard disk drive, an optical disk drive, a magnetic tape drive and a silicon disk.

The site B 102 is constituted by a disk control device B 1061, which includes an input/output interface 1062, a CPU 1063, a memory 1064 and a storage area interface 1065, and a disk drive B 1066 that includes a plurality of areas 1067. Since the structure of the disk control device B 1061 is substantially the same as that of the disk control device A 1051, no further explanation for it will be given. The contents of a program stored in the memory 1064 of the disk control device B 1061 differ, and the details of this program will be explained later.

(Operation)

Figure 2:
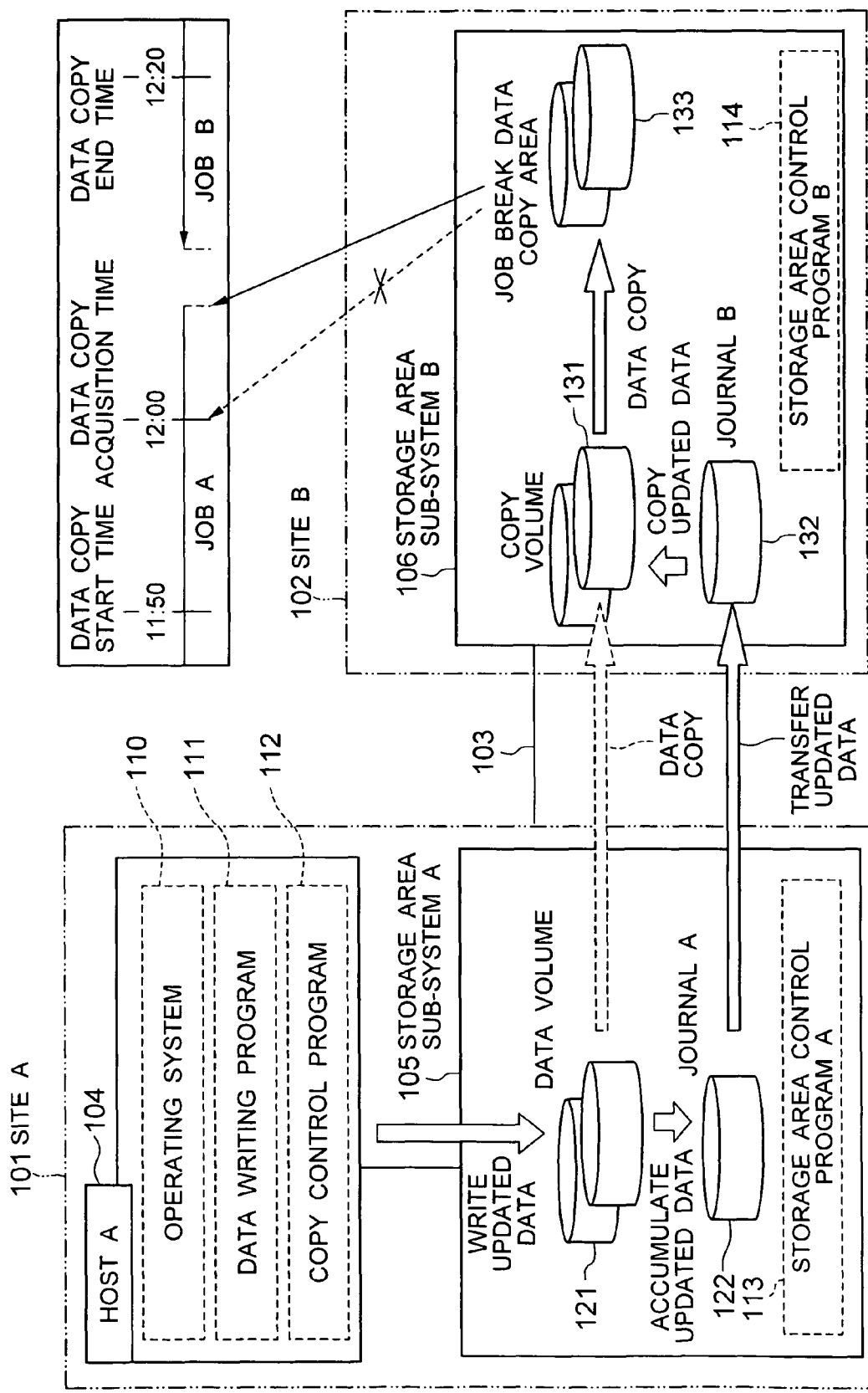
FIG. 2 is an explanatory diagram for explaining the operation performed to obtain a copy of data by employing asynchronous copying and a copy of data by performing copying at a designated time.

FIG. 2 is a diagram for explaining the operation of the storage area control system in FIG. 1 to acquire a data copy through asynchronous copying and to acquire a data copy by copying performed at a designated time.

While referring to FIG. 2, an explanation will be given for an example of the processing performed to obtain a data copy through asynchronous copying and to obtain a data copy by performing copying at a designated time (see also FIG. 1, as needed).

For the storage area control system of this embodiment, assume that a site that executes a process, such as a job, is the site A 101, a computer at this site is the host A 104 and a storage device at the site A 101 is the storage area subsystem A 105. Further, assume that a site whereat a data copy of the site A 101 is held is the site B 102, and the storage device at the site B 102 is the storage area subsystem B 106.

Further, for the storage area control system, in accordance with an asynchronous copy instruction or an instruction to copy data at a designated time, which is issued by a copy control program 112 stored in the memory 1042 at the host A 104, a data volume 121, at the storage area subsystem A 105, is copied to a copy volume 131 and a job break data copy area 133 in the storage area subsystem B 106.

The data volume 121 and a journal A 122, which will be described later, in the storage area subsystem A 105 are stored in the individual storage areas 1057 of the disk drive A 1056. The copy volume 131, the data copy indicating the end of a job and a journal B 132 in the storage area subsystem B 106 are stored in the individual storage areas 1067 of the disk drive B 1066.

Asynchronous copying is a process for asynchronously copying, to the copy volume 131 of the storage area subsystem B 106, the updated contents of the data volume 121 for the storage area subsystem A 105, and obtaining a copy of the data. When the asynchronous copying is performed, data from the data volume 121 is always copied to the data volume 131. It should be noted, however, that, because a data copy is obtained asynchronously, the data in the copy volume 131 is older than the data in the copy volume 121.

Data copying at a designated time is a process for copying, at the designated time, to the job break data copy area 133, in the storage area subsystem B 106, data from the data volume 121 in the storage area subsystem A 105. Generally, this data copy is obtained during a period wherein no job is being performed. Therefore, a data copy stored in the job break data copy area 133 is a data copy obtained during a break between jobs.

Thus, the job break data copy area 133 can also be employed in a case wherein the data is not suitable for a job program executed by the host A 104, because the job has not yet been completed.

In this embodiment, an operating system 110, a data writing program 111 and the copy control program 112 are stored in the memory 1042 of the host A 104, and these programs are executed by the CPU 1041. The operating system 110 processes input/output requests received from the data writing program 111 and the copy control program 112. The data writing program 111 is a program that performs a job while writing data to the data volume 121 of the storage area subsystem A 105, and the copy control program 112 is a program that instructs the performance of asynchronous copying, or of data copying performed at a designated time, as an input/output request.

A storage area control program A 113 is stored in the memory 1054 of the storage area subsystem A 105, and the data volume 121 and the journal A 122 are stored in the individual storage areas 1057 of the disk drive A 1056.

The storage area control program A 113 is a program that handles an input/output request received from the operating system 110 of the host A 104.

The journal A 122 of the storage area subsystem A 105 is a volume for accumulating, as updated data information, the updated contents of the data volume 121.

A storage area control program B 114 is stored in the memory 1064 of the storage area subsystem B 106, and the copy volume 131 and the journal B 132 are stored in the individual storage areas 1067 on the disk drive B 1066.

The storage area control program B 114 is a program that handles an input/output request issued by the storage area control program A 113.

The journal B 132 of the storage area subsystem B 106 is a volume for accumulating, as updated data information, the updated contents of the copy volume 131.

Explanation will now be given for an overview of the asynchronous copying operation performed when data are written by the data writing program 111. It should be noted that this asynchronous copying operation is a well known technique.

First, data written by the data writing program 111 of the host A 104 are to be processed by the operating system 110. When the data writing program 111 issues a data writing instruction to the operating system 110, updated data received from the data writing program 111 are set as updated data information 1103 (see FIGS. 3 and 7), which will be described later, and are transmitted to the storage area subsystem A 105.

In the storage area subsystem A 105, the storage area control program A 113 writes the received updated data to the data volume 121, and also stores them in the journal A 122. When the writing to the data volume 121 has been completed, the storage area control program A 113 notifies the operating system 110 of the host A 104 that the input/output has been completed.

Through this processing, updated data output by the data writing program 111 of the host A 104 are duplicated in the data volume 121 and the journal A 122 of the storage area subsystem A 105.

Next, explanation will be given for the operation of the copy control program 112 of the host A 104 for issuing an asynchronous copying instruction, and an overview of the asynchronous copying operation performed when this asynchronous copying instruction is received.

First, when an asynchronous copying instruction is issued by the copy control program 112 of the host A 104, the control process is shifted to the storage area control program B 114, of the storage area subsystem B 106, via the operating system 110 and the remote I/O controller 1133 (see FIG. 5) of the storage area control program A 113 for the storage area subsystem A 105.

Upon receiving the asynchronous copy instruction from the copy control program 112 of the host A 104, the storage area control program B 114 of the storage area subsystem B 106 periodically obtains updated data from the journal A 122 of the storage area subsystem A 105, and copies the updated data to the copy volume 131 of the storage area subsystem B 106.

The acquisition and copying of the updated data are asynchronously performed, and in a case wherein, when specific updated data are obtained, different updated data are then copied, the updated data that are obtained are temporarily stored in the journal B 132, and are then copied to the copy volume 131.

When the asynchronous copying is performed in this manner, the data volume 121 in the storage area subsystem A 105 can be recovered by using the copy volume 131, of the storage area subsystem B 106, when a failure is encountered in the data volume 121.

However, when a failure is also encountered in the copy volume 131 of the storage area subsystem B 106, or when data in the copy volume 131 can not be employed for the recovery, additional time will be required for the recovery. Thus, it is preferable that, at a designated time, a data copy of the data volume 121, in the storage area subsystem A 105, be obtained in the job break data copy area 133 of the storage area subsystem B 106.

At this time, it is a general rule that data should be copied during a time period in which the data writing program 111, of the host A 104, is not operating, so that the data volume 121 can be recovered from the job break data copy area 133.

However, assume that the data writing program 111 is not ended upon the start of data copying, or that the data writing program 111 is erroneously started before the data copy start time. In this case, since at a designated time the data writing program 111 is still being operated, a data copy obtained is inappropriate for the job data to be handled by a computer program, because the job has not yet been completed. Therefore, the end of the execution of the data writing program 111 is detected, and by employing the designated time as the target time, the end nearest the designated time is determined to be the data copy acquisition time. In this manner, the data copy acquisition time can be optimized.

Explanation will now be given for an example method for the optimization of a designated time for the acquisition of a data copy.

Figure 3:
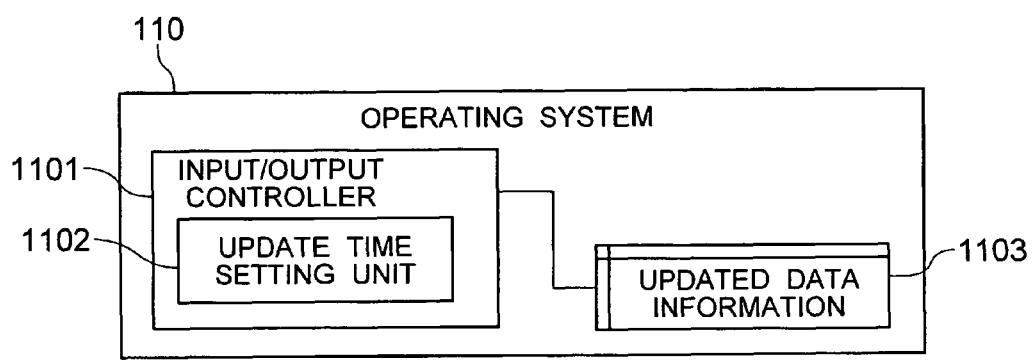
FIG. 3 is a functional block diagram showing an operating system.

FIG. 3 is a diagram showing example functional blocks required by the operating system 110 of the host A 104 for the optimization of the designated time for the acquisition of a data copy.

The operating system 110 in this embodiment comprises an input/output controller 1101, an update time setting unit 1102 and updated data information 1103. The input/output controller 1101 processes input/output requests received from the data writing program 111 and the copy control program 112, and transmits the processing results to these programs.

The input/output controller 1101 includes the update time setting unit 1102 that, when an input/output request is processed, enters update time 601 (see FIG. 7) in the updated data information 1103, which will be described later.

An example for the updated data information 1103 is shown in a table in FIG. 7. As shown in FIG. 7, the updated data information 1103 includes entries for the update time 601, an update location 602 and updated data 603. It should be noted that when a blank I/O is issued by a blank I/O issuing unit 1124 (see FIG. 4), which will be described later, of the copy control program 112, a record indicating the operation is ineffective is entered in the update location 602 and as the updated data 603, which are denoted by reference numeral 611.

Here, a blank I/O represents an I/O used to identify the end of a job, i.e., the completion of a job.

Figure 4:
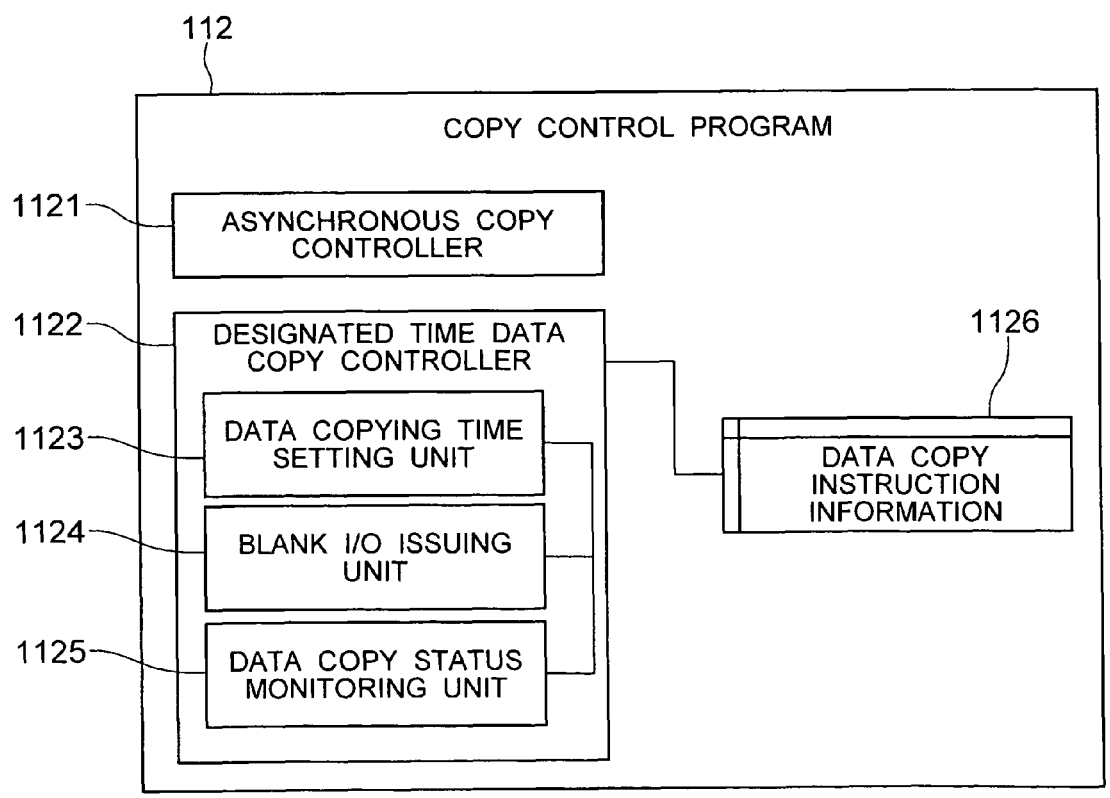
FIG. 4 is a functional block diagram showing a copy control program.

FIG. 4 is a diagram showing example functional blocks required for the copy control program 112 of the host A 104 for the optimization of a designated time for the acquisition of a data copy.

The copy control program 112 of this embodiment comprises: an asynchronous copy controller 1121, for instructing an asynchronous copying process; a designated time data copy controller 1122, for instructing the acquisition of a data copy at a designated time; and data copy instruction information 1126.

The designated time data copy controller 1122 includes: a data copying time setting unit 1123, for setting the data copy instruction information 1126; the blank I/O issuing unit 1124, for issuing a blank I/O; and a data copy status monitoring unit 1125, for monitoring the data copy status. In this embodiment, the blank I/O issuing unit 1124 of the copy control program 112 issues a blank I/O; however, either the operating system 110 or the storage area control program A 113 may issue a blank I/O.

An example for the data copy instruction information 1126 is shown in a table in FIG. 8. As shown in FIG. 8, the data copy instruction information 1126 includes entries for a data copy start time 711, a data copy acquisition time 712, a data copy end time 713, a blank I/O issuance interval 714 and a job break period 715. The job break period 715 is a value such that when the data writing program 111 has not issued an updated I/O during a period equivalent to this designated value, this period is regarded as the end of a job.

Since the data copy instruction information 1126 is varied, depending on the time slot for data copy management and the characteristics of a job, an appropriate value is designated, for example, by a user or an operation management system when the copy control program 112 is activated.

Figure 5:
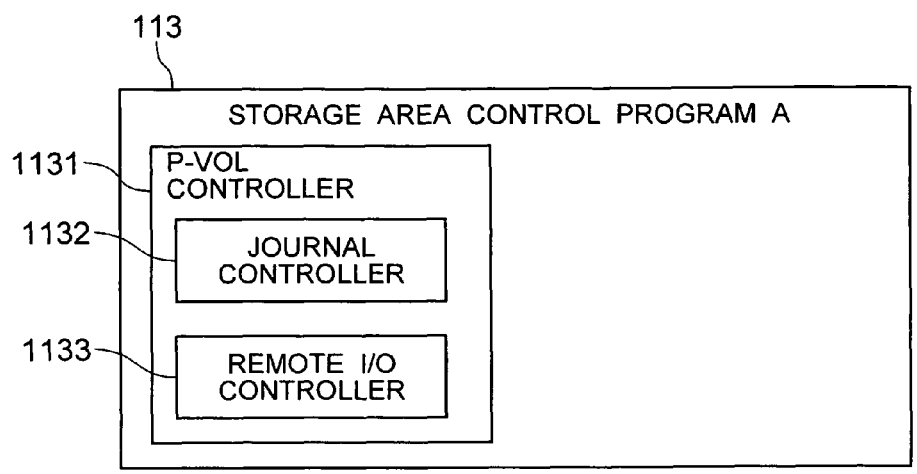
FIG. 5 is a functional block diagram showing a storage area control program A.

FIG. 5 is a diagram showing example functional blocks required for the storage area control program A 113, stored in the memory 1054 of the storage area subsystem A 105, for the optimization of a designated time for the acquisition of a data copy. The storage area control program A 113 processes a data input/output request received from the operating system 110.

The storage area control program A 113 of this embodiment includes a P-VOL controller 1131 that controls the disk drive A 1056, which is a primary copy source volume, and the P-VOL controller 1131 includes a journal controller 1132 and a remote I/O controller 1133.

Upon receiving a data input/output request from the operating system 110 of the host A 104, the journal controller 1132 copies updated data to the data volume 121, and accumulates the updated data in the journal A 122. Further, in accordance with a journal acquisition request received from the storage area control program B 114, the journal controller 1132 obtains the accumulated updated data from the journal A 122.

The remote I/O controller 1133 processes an input/output request to be transmitted to the disk controller B 1061 of the storage area subsystem B 106.

Figure 6:
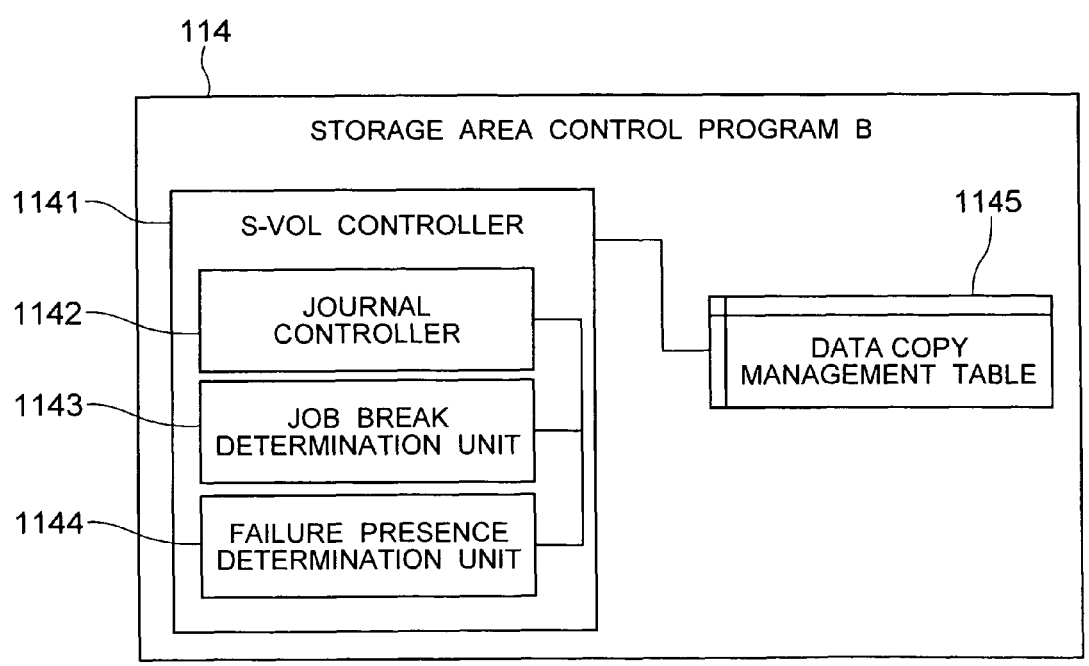
FIG. 6 is a functional block diagram showing a storage area control program B.

FIG. 6 is a diagram showing example functional blocks required for the storage area control program B 114 of the storage area subsystem B 106 for the optimization of a designated time for the acquisition of a data copy. The storage area control program B 114 processes an input/output request received from the remote I/O controller 1133 of the storage area control program A 113.

The storage area control program B 114 of this embodiment includes: an S-VOL controller 1141, which controls the disk drive B 1066, a secondary volume at a copy destination; and a data copy management table 1145, and the S-VOL controller 1141 includes a journal controller 1142, a job break determination unit 1143, and a failure presence determination unit 1144.

When the copy control program 112 has issued an input/output request related to an instruction for the acquisition of a data copy at a designated time, the control process is shifted to the journal controller 1142, via the operating system 110 of the host A 104 and the remote I/O controller 1133 of the storage area control program A 113. Thereafter, the journal controller 1142 initiates a process for the acquisition, at the designated time, of a data copy.

The job break determination unit 1143 determines whether a break has occurred between jobs or the like, in order to optimize the designated time for the acquisition of a data copy.

The failure presence determination unit 1144 determines whether, when a data copy is to be acquired at a designated time, a failure is present in the host A 104 or in the storage area subsystem A 105 at the site A 101.

An example for the data copy management table 1145 is shown in a table in FIG. 9. As shown in FIG. 9, the data copy management table 1145 includes entries for a data copy start time 811, a data copy acquisition time 812, a data copy end time 813, a blank I/O issuance interval 814, a job break period 815, a data copy status 816, a data copy execution time 817, a repetitive blank I/O acquisition count 818 and a temporary data copy execution time 819.

Explanation will now be given for a method for the optimization of a designated time for the acquisition of a data copy (see FIGS. 1 to 9, as needed).

FIG. 10 is a flowchart showing an overview of the process for acquiring a data copy at a designated time. As shown in FIG. 10, the process in this embodiment for acquiring a data copy at a designated time consists of "the copy control program sets a designated time for data copying (step S1001)", "the copy control program issues a blank I/O (step S1002)", "the site A accumulates updated data and journals for blank I/Os (step S1003)" and "the site B acquires a data copy at a designated time (step S1004)".

Figure 11:
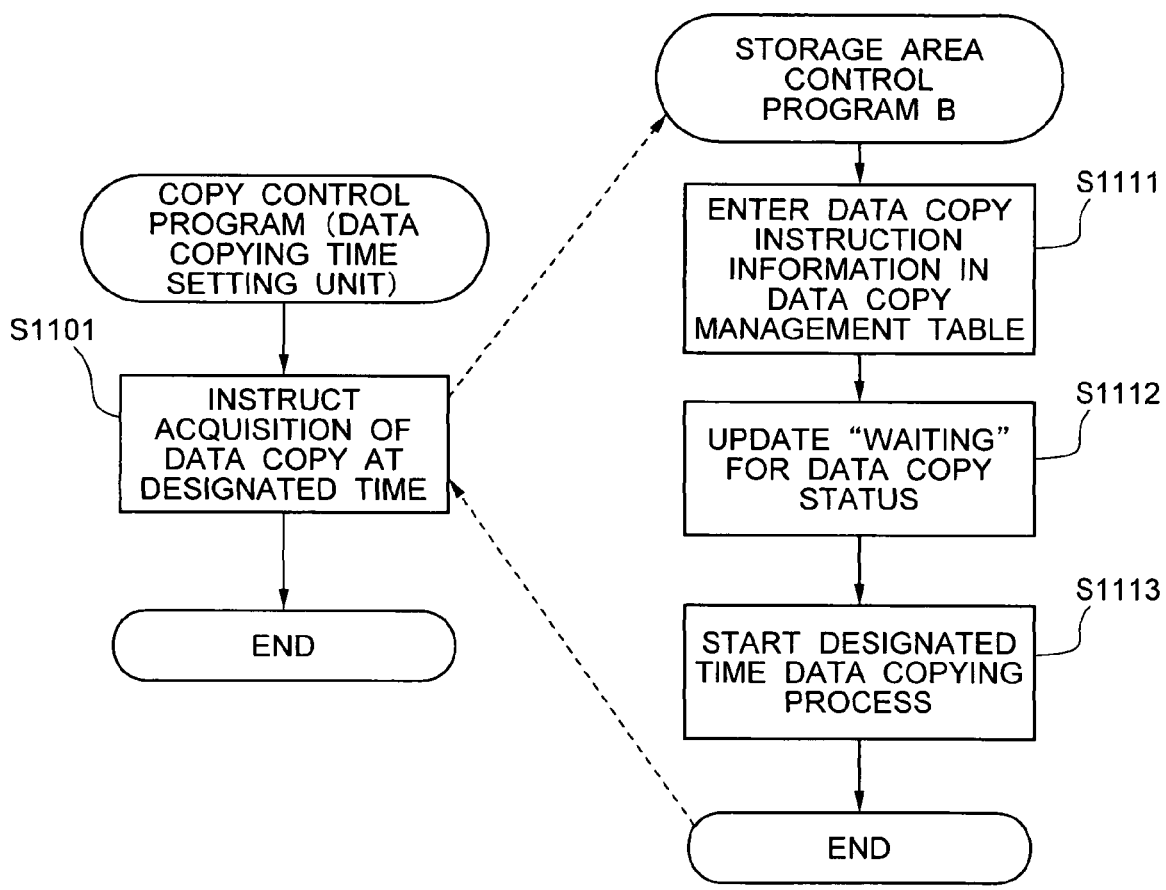
FIG. 11 is a flowchart showing a data copy time setting process.

First, a process performed by the copy control program, to set a designated time for data copying (step S1001), will be described in detail. FIG. 11 is a flowchart showing the data copying time setting process, performed by the copy control program 112 of the host A 104, and the storage area control program B of the storage area subsystem B 106, when the copy control program 112 of the host A 104 has issued an instruction for the acquisition of a data copy at a designated time.

In this case, the instruction for the acquisition of a data copy at a designated time is issued when a user, or an operation management system (not shown), activates the copy control program 112 before the data copy start time.

First, the copy control program 112 of the host A 104 selects data copy instruction information 1126 (see FIG. 8), and transmits an input/output request (data copy instruction information 1126) to instruct the acquisition of a data copy at a designated time (step S1101). This input/output instruction is passed through the operating system 110 of the host A 104 and the remote I/O controller 1133 of the storage area control program A 113, and is transmitted to the storage area control program B 114.

The storage area control program B 114 of the storage area subsystem B 106 enters the received data copy instruction information 1126 in the data copy management table 1145 (see FIG. 9) (step S1111), and updates to "waiting" the value of the data copy status 816 in the data copy management table 1145 (step S1112). Then, the process for the acquisition of a data copy at a designated time is begun (step S1113). This process will be described later.

The data copy instruction information 1126 (see FIG. 8) transmitted at step S1101 is to be designated when a user or an operation management system activates the copy control program 112. Either this, or the operation management system or the copy control program 112 may determine and set the optimal time.

An arbitrary time, following the time at which the input/output request for instructing the acquisition of a data copy at a designated time was issued, is entered in the individual entries for the data copy start time 711, the data copy acquisition time 712 and the data copy end time 713 for the data copy instruction information 1126. Further, the interval at which the blank I/O issuing unit 1124 of the copy control program 112 issued a blank I/O, during a period extending from the data copy start time 711 to the data copy end time 713, is entered in the blank I/O issuance interval 714.

As described above, in the job break period 715, such a value is entered that, when the data writing program 111 has not issued an updated I/O during a period equivalent to this value, this period is regarded as the break between jobs or the like. Therefore, when the data writing program 111 is to be sequentially executed, the interval equivalent to the designated value should be obtained before and after the execution of the data writing program 111. Further, in a case wherein, when during the execution of the data writing program 111 an updated I/O is not issued for a period equivalent to this designated value, this period is regarded as the end of a job, and, thus, for example, the data writing program 111 should periodically output a log to the data volume 121.

Next, explanation will now be given for the blank I/O issuance operation of the copy control program 112 of the host A 104 and the operation of the host A 104 to accumulate updated data for a blank I/O in a journal, both of which are performed after the process at S1113 for the acquisition of a data copy at a designated time is initiated.

Figure 12:
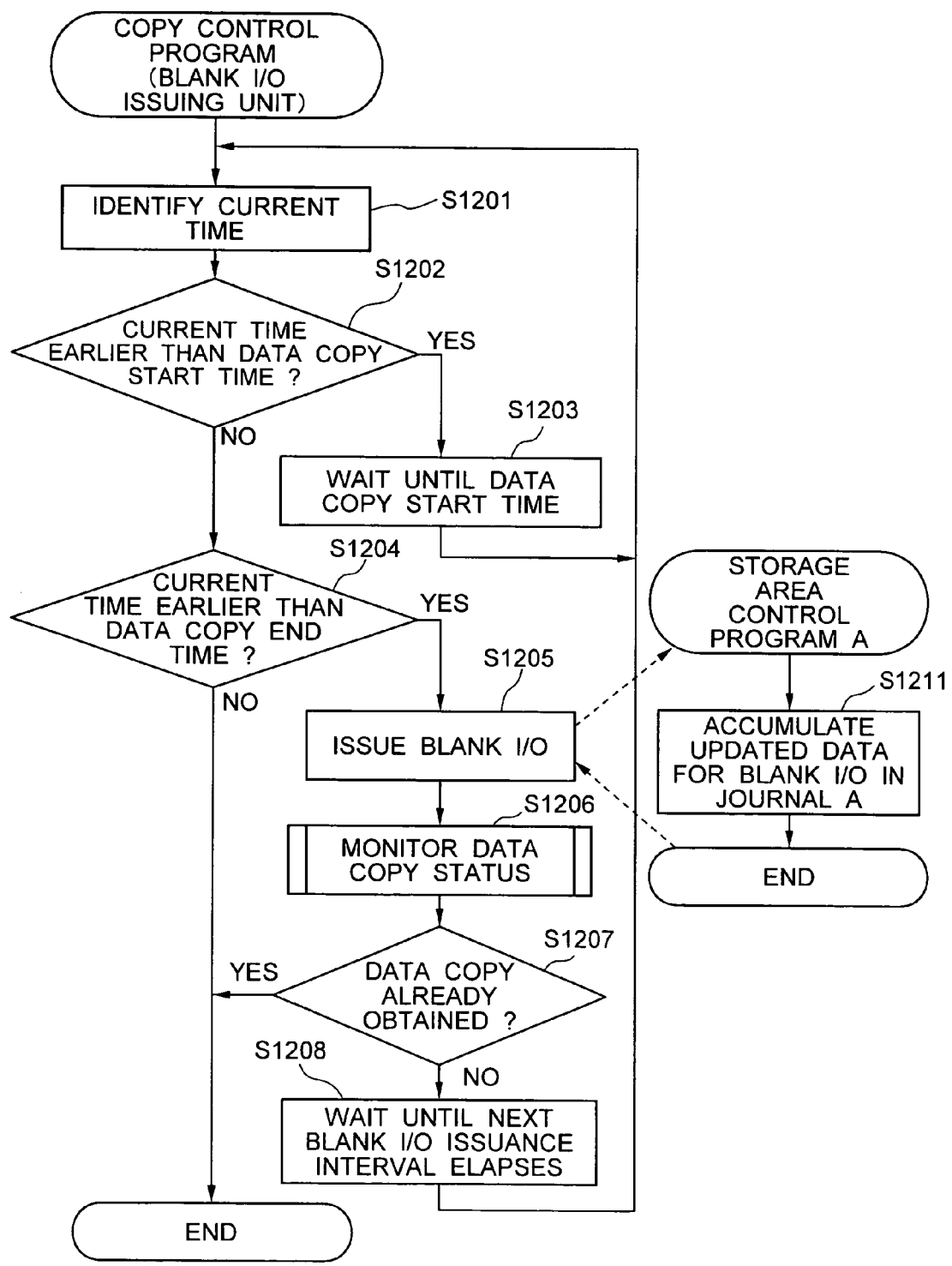
FIG. 12 is a flowchart showing a blank I/O issuing process performed by a copy control program.

FIG. 12 is a flowchart showing the blank I/O issuance process performed by the copy control program 112 of the host A 104.

First, when an instruction for the acquisition of a data copy at a designated time is issued, the copy control program 112 identifies the current time by referring to the relationship between the current time and the data copy start time 711 and the data copy end time 713 included in the data copy instruction information 1126 (see FIG. 8) (step S1201). The copy control program 112 determines whether the current time is earlier than the data copy start time (step S1202), and when the current time is earlier than the data copy start time (YES at step S1202), returns to step S1201 to wait for the data copy start time (step S1203). When the current time is not earlier than the data copy start time (NO at step S1202), the copy control program 112 determines whether the current time is earlier than the data copy end time (step S1204).

When, according to the decision at step S1204, the current time is not earlier than the data copy end time (NO at step S1204), the processing is terminated.

When the current time is earlier than the data copy end time (YES at step S1204), the copy control program 112 issues a blank I/O (step S1205), and monitors the data copy status (step S1206). The updated data for the blank I/O that is issued at this time is transmitted to the storage area control program A 113, which then accumulates the updated data for the blank I/O in the journal A 122 (step S1211).

It should be noted that the process at step S1206 for monitoring the data copy status will be described in detail later. When the copy control program 112 has issued the blank I/O at step S1205, the journal controller 1132 of the storage area control program A 113 accumulates the updated data for the blank I/O in the journal A 122, together with the update data for the data writing program 111.

Then, the copy control program 112 determines whether a data copy has been obtained (step S1207). When a data copy has already been acquired (YES at step S1207), the processing is terminated. When a data copy has not yet been obtained (NO at step S1207), the copy control program 112 waits, for the issuance of the next blank I/O, for a period designated in the blank I/O issuance interval 714 of the data copy instruction information 1126 (step S1208). Thereafter, the copy control program returns to step S1201.

Through the above described processing, the functions generally provided for the operating system 110 can be employed for the process that waits until the data copy start time (step S1203) and the process that waits for a designated period in the blank I/O issuance interval 714 (step S1208).

Figure 13:
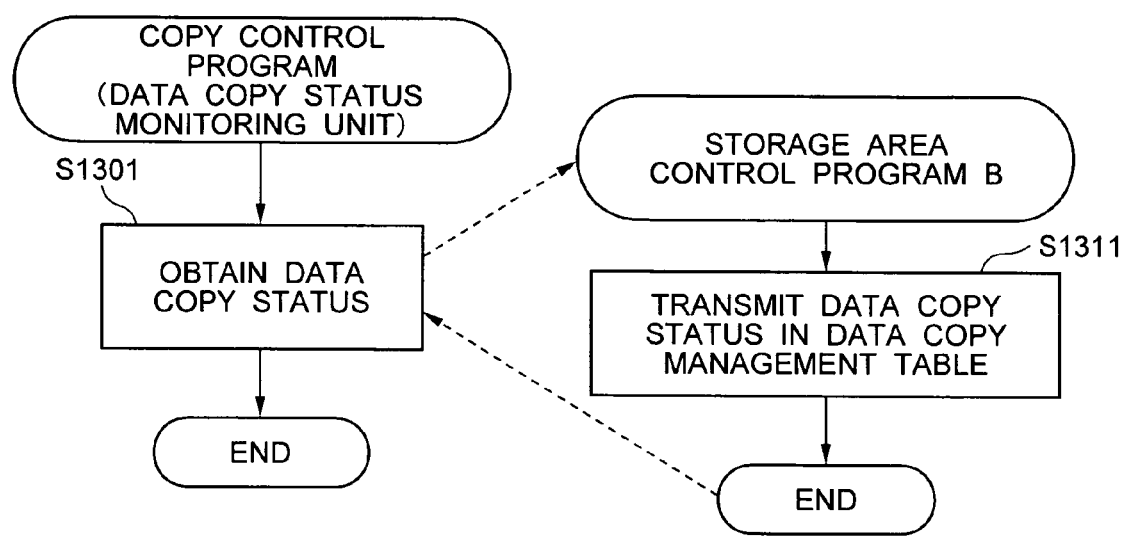
FIG. 13 is a flowchart showing a data copy status monitoring process.

The data copy status monitoring process at step S1206 will now be described sequentially, in detail, while referring to the flowchart in FIG. 13. First, the copy control program 112 forwards a request to the storage area subsystem B 106 for the transmission of the data copy status 816 in the data copy management table 1145 (see FIG. 9). Upon receiving this request, the storage area control program B 114 transmits to the host A 104 the data copy status 816 for the data copy management table 1145 (see FIG. 9) (step S1311). Then, the copy control program 112 obtains the data copy status 816 from the storage area control program B 114 (step S1301). That is, to monitor the data copy status, the storage area control program B 114 examines the data copy status 816 for the data copy management table 1145.

Figure 14:
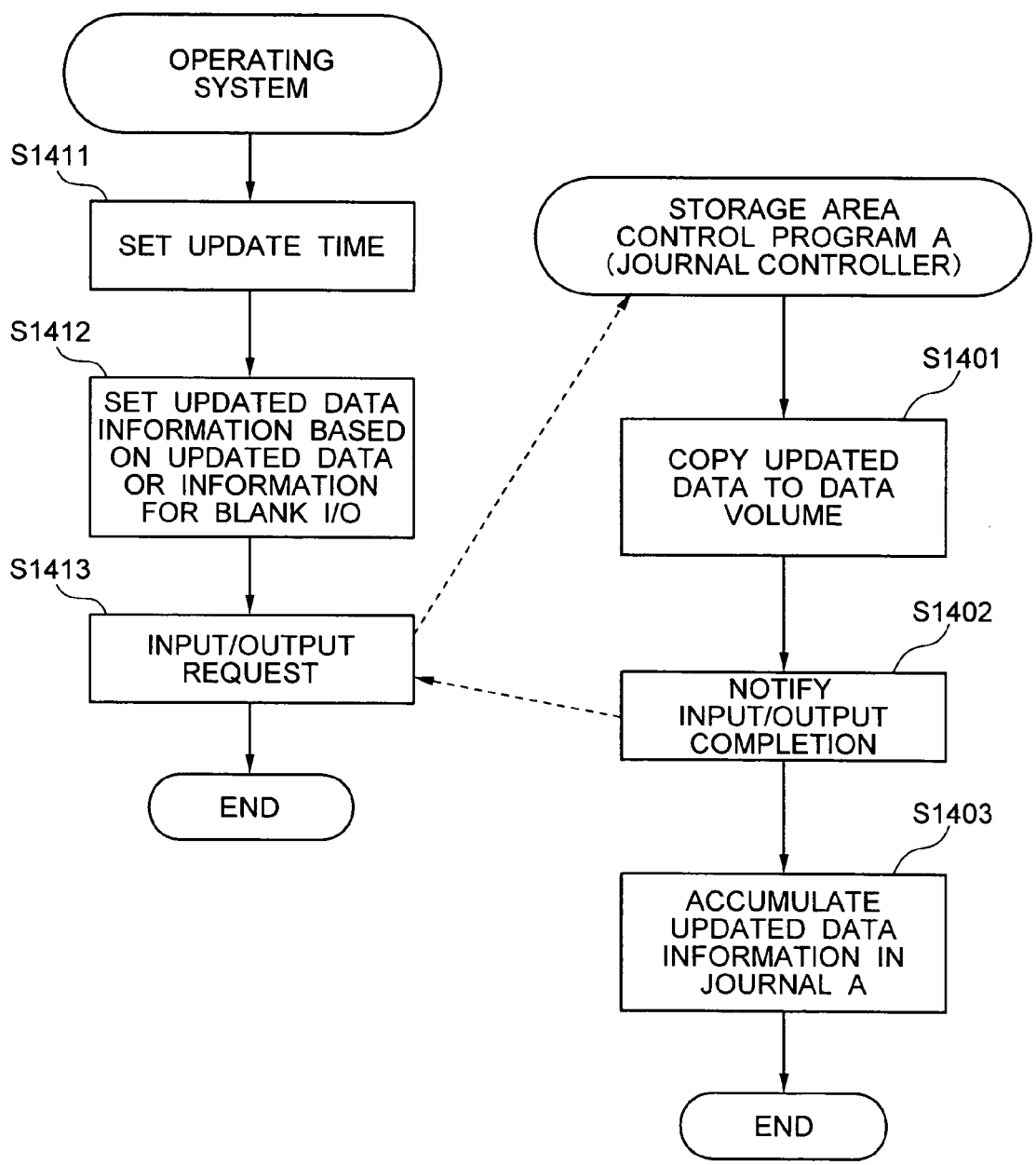
FIG. 14 is a flowchart showing a process for the accumulation of updated data or blank I/O information in a journal A.

Furthermore, when the blank I/O issuing unit 1124 for the copy control program 112 issues a blank I/O at step S1205 in the flowchart in FIG. 12, the journal controller 1142 of the storage area control program A 113 acquires the updated data for the blank I/O accumulated in the journal A 122 of the storage area subsystem A 105. This accumulation process will be explained while referring to the flowchart in FIG. 14.

Assume that the operating system 110 of the host A 104 obtains information for a blank I/O issued by the blank I/O issuing unit 1124 of the copy control program 112, or updated data output by the data writing program 111. Then, in accordance with the acquisition time, the operating system 110 sets the update time (step S1411), and employs the update time and the updated data, or the information for the blank I/O, to designate the updated data information 1103 (see FIG. 7) (step S1412).

Following this, the operating system 110 issues to the storage area control program A 113 an input/output request for the updated data information 1103 that is designated at step S1412 (step S1413).

Upon receiving this input/output request, the storage area control program A 113 of the storage area subsystem A 105 copies to the data volume 121 the updated data 603 for the updated data information 1103 that is obtained (see FIG. 7) (step S1401), and transmits an input/output completion notification to the operating system 110 of the host A 104 (step S1402). Then, the storage area control program A 113 accumulates in the journal A 122 the updated data information 1103 (step S1403).

Through the above described processing, the updated data or the information for the blank I/O is accumulated in the journal A 122 of the storage area subsystem A 105.

Next, explanation will be given for the operation of the storage area control program B 114, of the storage area subsystem B 106, performed when an instruction is issued for the acquisition of a data copy at a designated time.

FIGS. 15A to 15E are flowcharts showing the process, performed by the storage area control program B 114 of the storage area subsystem B 106, for the acquisition of a data copy at a designated time.

First, the storage area control program B 114 initializes the repetitive blank I/O acquisition count 818 for the data copy management table 1145 (see FIG. 9) (step S1501), transmits a request to the storage area control program A 113, of the storage area subsystem A 105, for the transmission of the updated data information 1103, and shifts the control process. Then, the storage area control program B 114 obtains the updated data information 1103 from the storage area control program A 113 of the storage area subsystem A 105, which received the transmission request (step S1502).

At this time, the storage area control program A 113 of the storage area subsystem A 105 acquires the updated data information 1103, from the journal A 122 (step S1511), and transmits it to the storage area control program B 114.

After the updated data information 1103 has been obtained, the storage area control program B 114 performs a process to determine whether a failure has been encountered (step S1503). Through this process, the storage area control program B 114 determines whether a failure is present (step S1504). When a failure is present (YES at step S1504), the storage area control program B 114 enters "failure", as the data copy status 816, in the data copy management table 1145 (see FIG. 9) (step S1505), and halts the acquisition of a data copy. In this case, a data copy obtained at the preceding designated time is retained in the job break data copy area 133.

Figure 16:
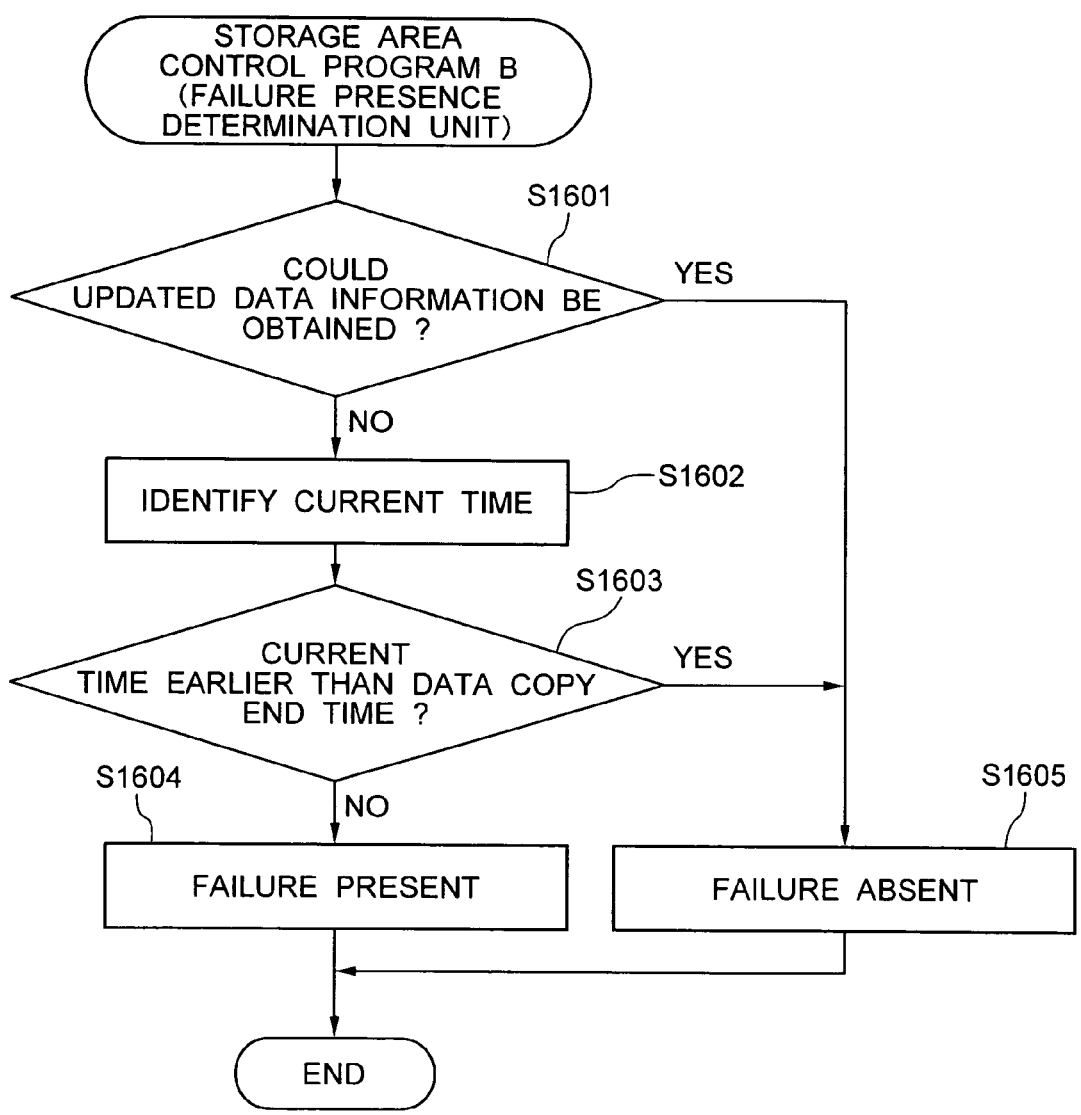
FIG. 16 is a flowchart showing a process for determining whether a failure has been encountered.

The failure presence determination process will be explained while referring to the flowchart in FIG. 16. The failure presence determination unit 1144 for the storage area control program B 114 determines whether the updated data information 1103 could be obtained from the journal A 122 of the storage area subsystem A 105 (step S1601) at step S1502. When the updated data information 1103 could be obtained (YES at step S1601), the storage area control program B 114 examines the relationship between the current time and the data copy end time 813 entry for the data copy management table 1145 (see FIG. 9) (step S1602), and determines whether the current time is earlier than the data copy end time 813 (step S1603).

When the current time is not earlier than the data copy end time 813 (NO at step S1603), i.e., when the updated data information 1103 could not be obtained when the data copy end time had elapsed, it is determined that "a failure is present" (step S1604).

When, at step S1601, the updated data information 1103 could be obtained (YES at step S1601), or when, at step S1603, the current time is earlier than the data copy end time 813 (YES at step S1603), it is determined that "no failure is present" (step S1605).

Referring again to FIG. 15A, when a failure is not encountered at step S1504 (NO at step S1504), the storage area control program B 114 determines whether the updated data information 1103 could be obtained from the journal A 122 of the storage area subsystem A 105 at S1502 (step S1506). When the updated data information 1103 could not be obtained (NO at step S1506), the storage area control program B 114 returns to step S1502 for the acquisition of the updated data information 1103. When the updated data information 1103 could be obtained at step S1502 (YES at S1506), the storage area control program B 114 determines whether the update time 601 for the updated data 603 in the updated data information 1103 that is obtained is earlier than the data copy start time 811 entry for the data copy management table 1145 (see FIG. 9) (step S1507).

Figure 15B:
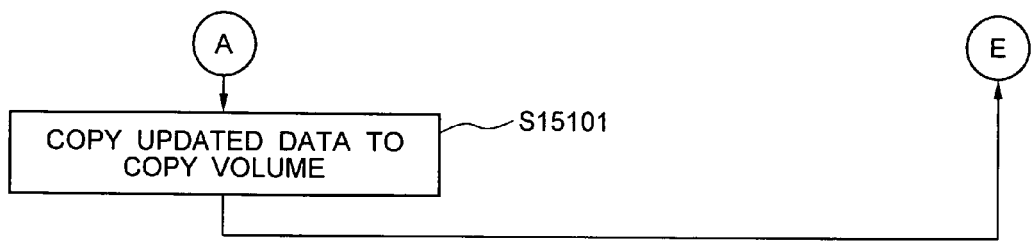
FIG. 15B is a flowchart showing the process for the acquisition of a data copy at a designated time.

When the update time 601 is earlier than the data copy start time 811 at step S1507 (YES at step S1507), program control is shifted, via terminal A, to FIG. 15B, and the storage area control program B 114 copies the updated data to the copy volume 131 (step S15101). Thereafter, program control is returned, via terminal E, to the process for the acquisition of the updated data information 1103 in FIG. 15A (step S1502).

When, at step S1507, the update time 601 for the updated data 603 of the obtained updated data information 1103 (see FIG. 7) is not earlier than the data copy start time 811 (NO at step S1507), the storage area control program B 114 determines whether the update time 601 is earlier than the data copy acquisition time 812 entry for the data copy management table 1145 (see FIG. 9) (step S1508).

Figure 15C:
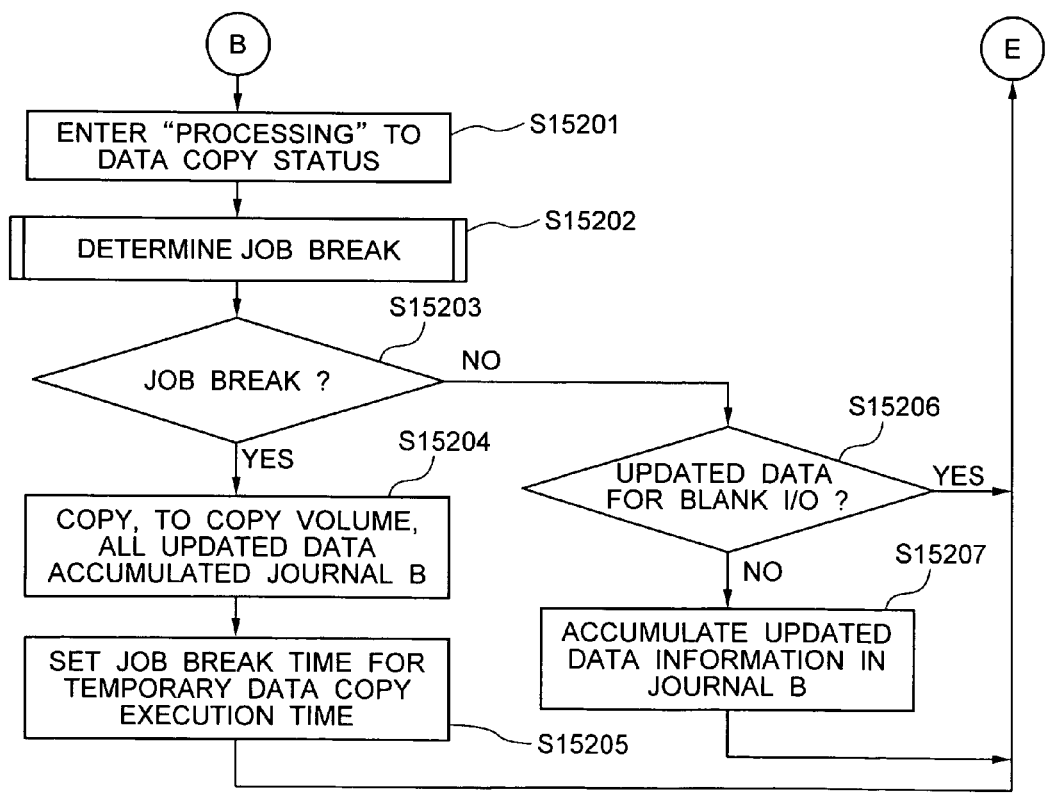
FIG. 15C is a flowchart showing the process for the acquisition of a data copy at a designated time.

When, at step S1508, the update time 601 is earlier than the data copy acquisition time 812 (YES at step S1508), program control is shifted, via terminal B, to FIG. 15C. The storage area control program B 114 enters "processing", as the data copy status 816, in the data copy management table 1145 (see FIG. 9) (step S15201), performs a job break determination process (step S15202), and determines whether the end of a job or the like was detected (step S15203). It should be noted that the job break determination process at step S15202 will be described in detail later.

When a break between jobs or the like is detected at step S15203 (YES at step S15203), the storage area control program B 114 copies to the copy volume 131 all the updated data accumulated in the journal B 132 of the storage area subsystem B 106 (step S15204), and sets, as the temporary data copy execution time 819 for the data copy management table 1145 (see FIG. 9), the update time 601 for the updated data 603 included in the updated data information 1103 (see FIG. 7) that was obtained at step S1502 in FIG. 15A (step S15205). Thereafter, program control is returned, via terminal E, to the process in FIG. 15A for the acquisition of the updated data information 1103 (step S1502).

When a break between jobs or the like is not detected at step S15203 (NO at step S15203), the storage area control program B 114 determines whether the updated data information 1103 (see FIG. 7), which was obtained at step S1502 in FIG. 15A, is the updated data information 1103 for a blank I/O (step S15206). When the updated data information 1103 is for a blank I/O (YES at step S15206), program control is returned directly, via terminal E, to the process in FIG. 15A for the acquisition of the updated data information 1103 (step S1502). When the updated data information 1103 is not for a blank I/O (NO at step S15206), this updated data information 1103 is stored in the journal B 132, and then, program control is returned, via terminal E, to the process in FIG. 15A for the acquisition of the updated data information 1103 (step S1502).

The performance of the determination made at step S15206, to decide whether the updated data information 1103 is for a blank I/O, depends on whether the update location 602 and the updated data 603 in the updated data information 1103 (see FIG. 7) are ineffective.

Referring again to FIG. 15A, when, at step S1508, the update time 601 for the updated data 603 of the updated data information 1103 (see FIG. 7), which was obtained at step S1502, is not earlier than the data copy acquisition time 812 (NO at step S1508), the storage area control program B 114 determines whether the update time 601 is earlier than the data copy end time 813 for the data copy management table 1145 (see FIG. 9) (step S1509). When the update time 601 is earlier than the data copy end time 813 (YES at step S1509), program control is shifted, via terminal C, to FIG. 15D. The storage area control program B 114 enters "processing", as the data copy status 816, in the data copy management table 1145 (see FIG. 9) (step S15301) and performs a job break determination process (step S15302), the results of which are used to detect a break between jobs or the like (step S15303).

When a break between jobs is not detected at step S15303 (NO at step S15303), the storage area control program B 114 determines whether the updated data information 1103 (see FIG. 7), obtained at step S1502 in FIG. 15A, is updated data information 1103 for a blank I/O (step S15304). When the updated data information 1103 is for a blank I/O (YES at step S15304), program control is returned directly, via terminal E, to the process in FIG. 15A for the acquisition of the updated data information 1103 (step S1502). When the updated data information 1103 is not for a blank I/O (NO at step S15304), the storage area control program B 114 accumulates this updated data information 1103 in the journal B 132 (step S15305), and thereafter, program control is returned, via terminal E, to the process in FIG. 15A for the acquisition of the updated data information 1103 (step S1502).

When a break between jobs or the like is detected at step S15303 (YES at step S15303), the storage area control program B 114 compares the time for the detected job break with the temporary data copy execution time 819 of the data copy management table 1145 (see FIG. 9) (step S15306), and determines whether the job break time is nearer than the temporary data copy execution time 819 to the data copy acquisition time 812 in the data copy management table 1145 (see FIG. 9) (step S15307).

When at step S15307 the job break time is nearer (YES at step S15307), the storage area control program B 114 copies to the copy volume 131 all the updated data accumulated in the journal B 132 (step S15308), and enters this job break time as the data copy execution time 817 in the data copy management table 1145 (see FIG. 9) (step S15309).

When at step S15307 the temporary data copy execution time 819 is nearer (NO at step S15307), the storage area control program B 114 enters the temporary data copy execution time 819 as the data copy execution time 817 in the data copy management table 1145 (step S15309).

The storage area control program B 114 copies the copy volume 131 to the job break data copy area 133 (step S15311), and enters "completion", as the data copy status 816, in the data copy management table 1145 (see FIG. 9). The processing is thereafter terminated (step S15312).

Figure 15D:
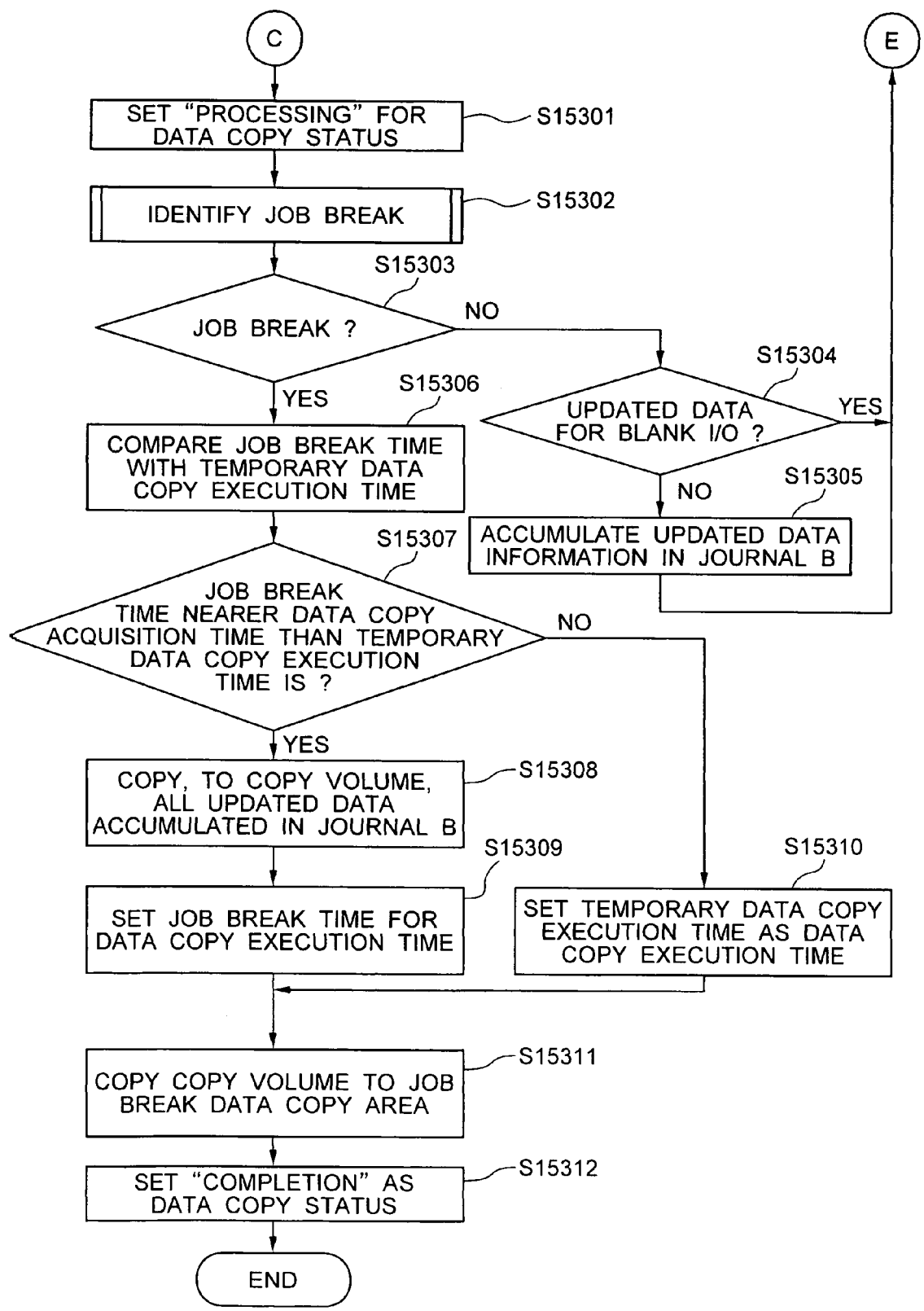
FIG. 15D is a flowchart showing the process for the acquisition of a data copy at a designated time.
Figure 15E:
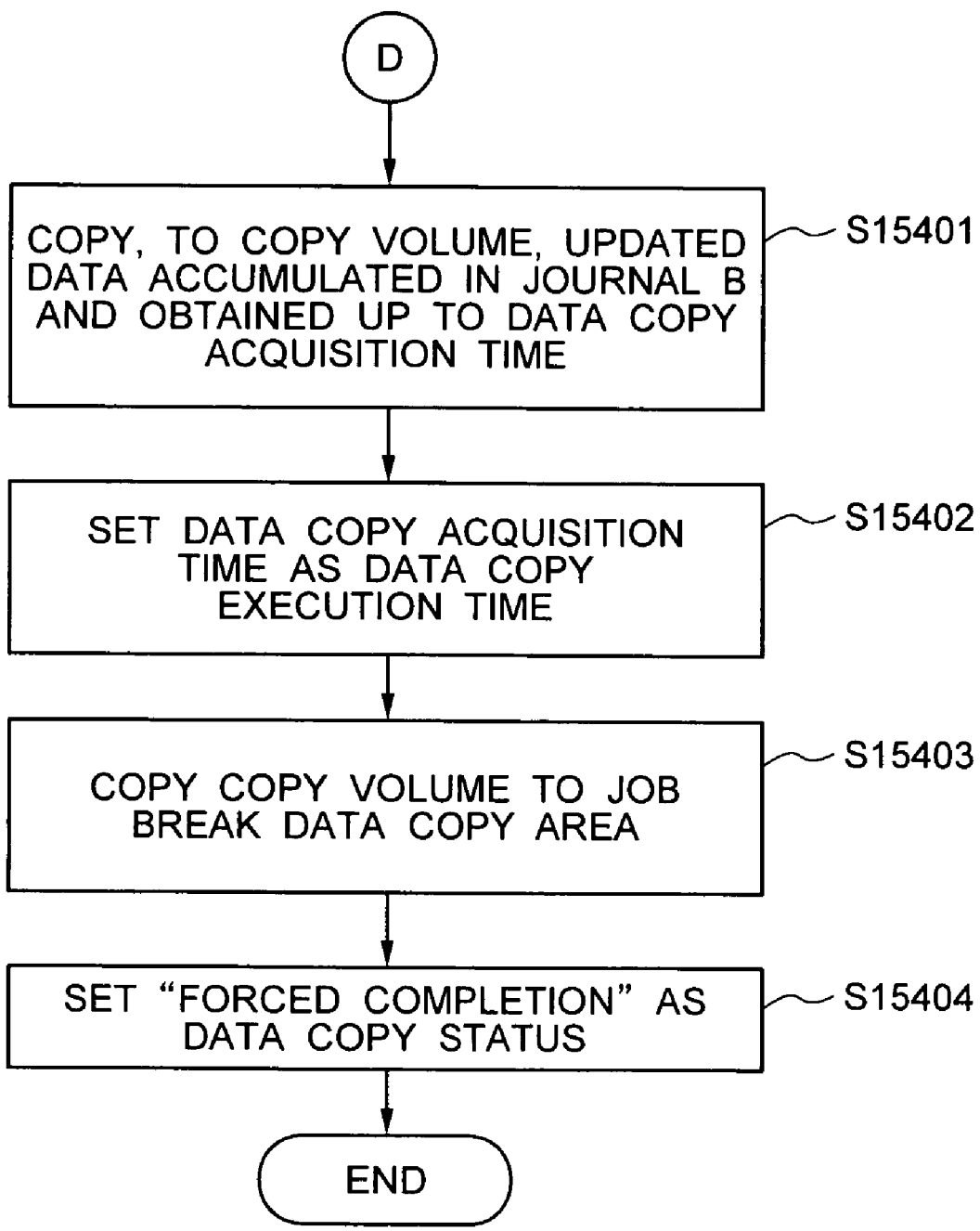
FIG. 15E is a flowchart showing the process for the acquisition of a data copy at a designated time.

Referring again to FIG. 15A, when, at step S1509, the update time 601 is not earlier than the data copy end time 813 (NO at step S1509), program control is shifted, via terminal D, to FIG. 15D. The storage area control program B 114 then copies, to the copy volume 131, the updated data have been accumulated in the journal B 132 and that were obtained by the data copy acquisition time 812 of the data copy management table 1145 (see FIG. 9) (step S15401). Then, the storage area control program B 114 designates, as the data copy execution time 817, the data copy acquisition time 812 of the data copy management table 1145 (step S15402).

Sequentially, thereafter, the storage area control program B 114 copies the copy volume 131 to the job break data copy area 133 (step S15403), and enters "forced completion", as the data copy status 816 (step S15404). All the processing is thereafter terminated.

Figure 17:
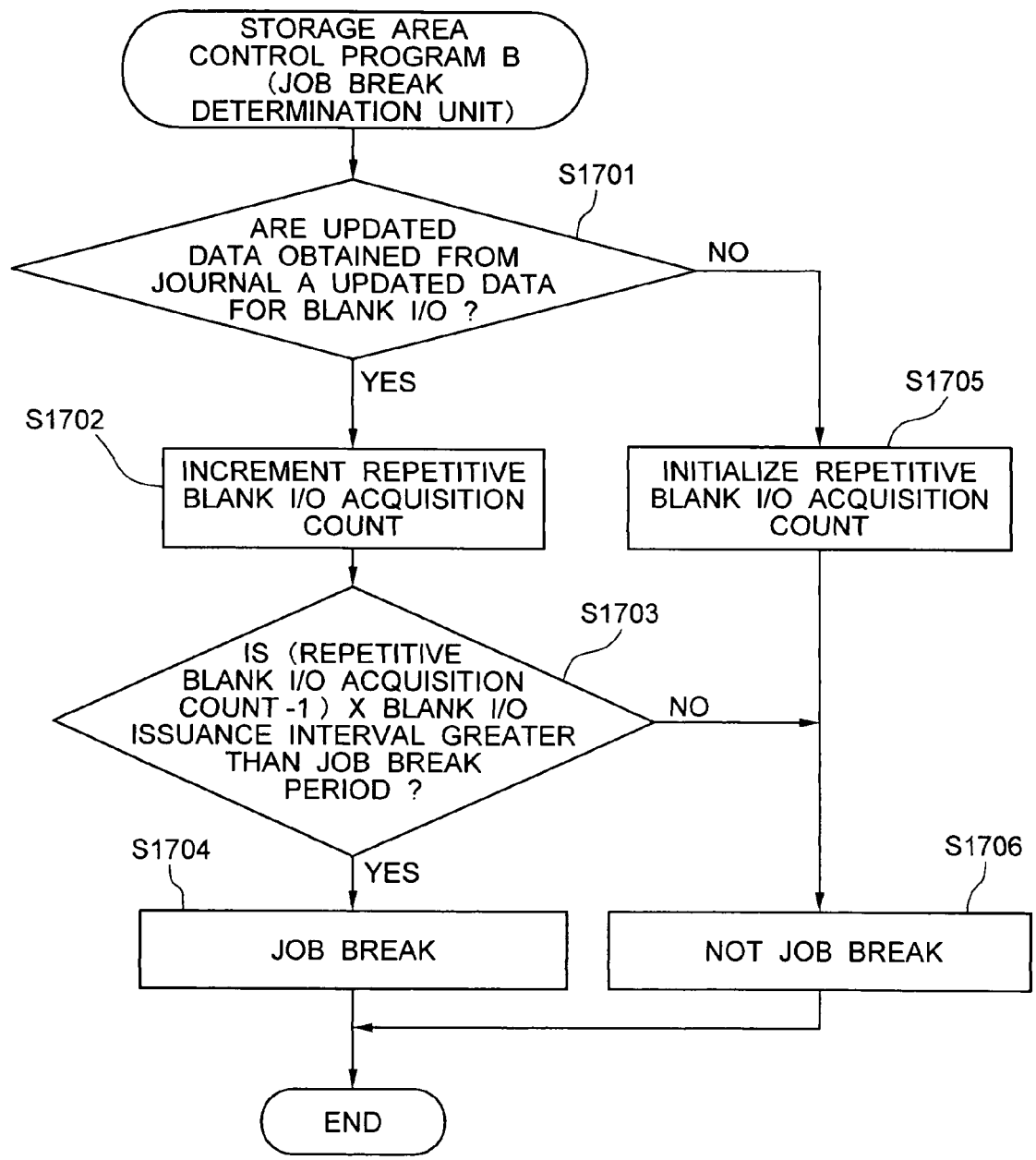
FIG. 17 is a flowchart showing the process for determining whether there is a break between jobs.

The job break determination process at step S15202 in FIG. 15C and at step S15302 in FIG. 15D will now be explained in detail. FIG. 17 is a flowchart showing the job break determination processing performed by the job break determination unit 1143 of the storage area control program B 114.

First, the storage area control program B 114 determines whether updated data obtained from the journal A at step S1502 in FIG. 15A is the updated data information 1103 for a blank I/O (step S1701). When the updated data is the updated data information 1103 for a blank I/O (YES at step S1701), the storage area control program B 114 increments the repetitive blank I/O acquisition count 818 in the data copy management table 1145 (see FIG. 9) (step S1702), and determines whether (repetitive blank I/O acquisition count (818)−1)×blank I/O issuance interval (814)) is greater than the job break period 815 (step S1703).

When the result is greater than the job break period 815 (YES at step S1703), the storage area control program B 114 assumes that blank I/Os have been repetitively issued for a predetermined period of time, and determines that this period is a break between jobs or the like (step S1704). The processing is thereafter terminated.

When, at step S1701, updated data obtained from the journal A 122 is not the updated data information 1103 for a blank I/O (No at step S1701), the storage area control program B 114 initializes to 0 the repetitive blank I/O acquisition count 818 in the data copy management table 1145 (see FIG. 9) (step S1705), and determines that the current period is not a break between jobs or the like (step S1706). The processing is thereafter terminated.

Furthermore, when, as the result of the comparison at step S1703, the value is not greater than the job break period 815 (NO at step S1703), the storage area control program B 114 determines that the current time is not the end of a job or the like (step S1706), and the processing is terminated.

By performing the process sequence shown in the flowchart in FIG. 10 in the above described manner, a designated time for the acquisition of a data copy can be optimized.

Next, an example determination of an optimal time for data copying, as performed in the above described manner, will be explained by employing patterns. FIG. 18A is a table showing setup values for a data copy start time, a data copy acquisition time and a data copy end time employed for this example. FIGS. 18B to 18E are diagrams for explaining examples of settings for optimal data copy execution times.

In this case, as shown in FIG. 18A, assume that the data copy start time is 11:50, the data copy acquisition time is 12:00 and the data copy end time is 12:20.

In the example in FIG. 18B, a break between jobs or the like is detected at data copy acquisition time 12:00, and since no job or the like is being processed at 12:00, the optimal data copy execution time is determined to be 12:00.

In the example in FIG. 18C, since job B is being processed at data copy acquisition time 12:00, job break time 11:58, which is nearest the data copy acquisition time 12:00, is determined to be the optimal data copy execution time.

In the example in FIG. 18D, since job A is being processed at data copy acquisition time 12:00, job break time 12:03, which is nearest the data copy acquisition time 12:00, is determined to be the optimal data copy execution time.

In the example in FIG. 18E, job A is being processed at data copy acquisition time 12:00. A job break is present before and after job A (11:58 and 12:10), and job break time 11:58, that is nearer the data copy acquisition time 12:00, is determined to be the optimal data copy execution time.

According to the storage area control system of the above described embodiment, when the sites 101 and 102, connected via the communication line 103, are to obtain a data copy at a designated time, the optimal time for the acquisition of a data copy can be calculated without having to avoid the occurrence of an I/O. Therefore, when a failure is encountered, the recovery time can be reduced, while the reliability of the system is increased.

Second Embodiment

System Configuration

A second embodiment of the present invention will now be described. In this embodiment, disk drives at the same site are used to obtain a local copy at a designated time.

For this embodiment, the same reference numerals are provided for the same components as in the first embodiment, and no further explanation for them will be given.

Figure 19:
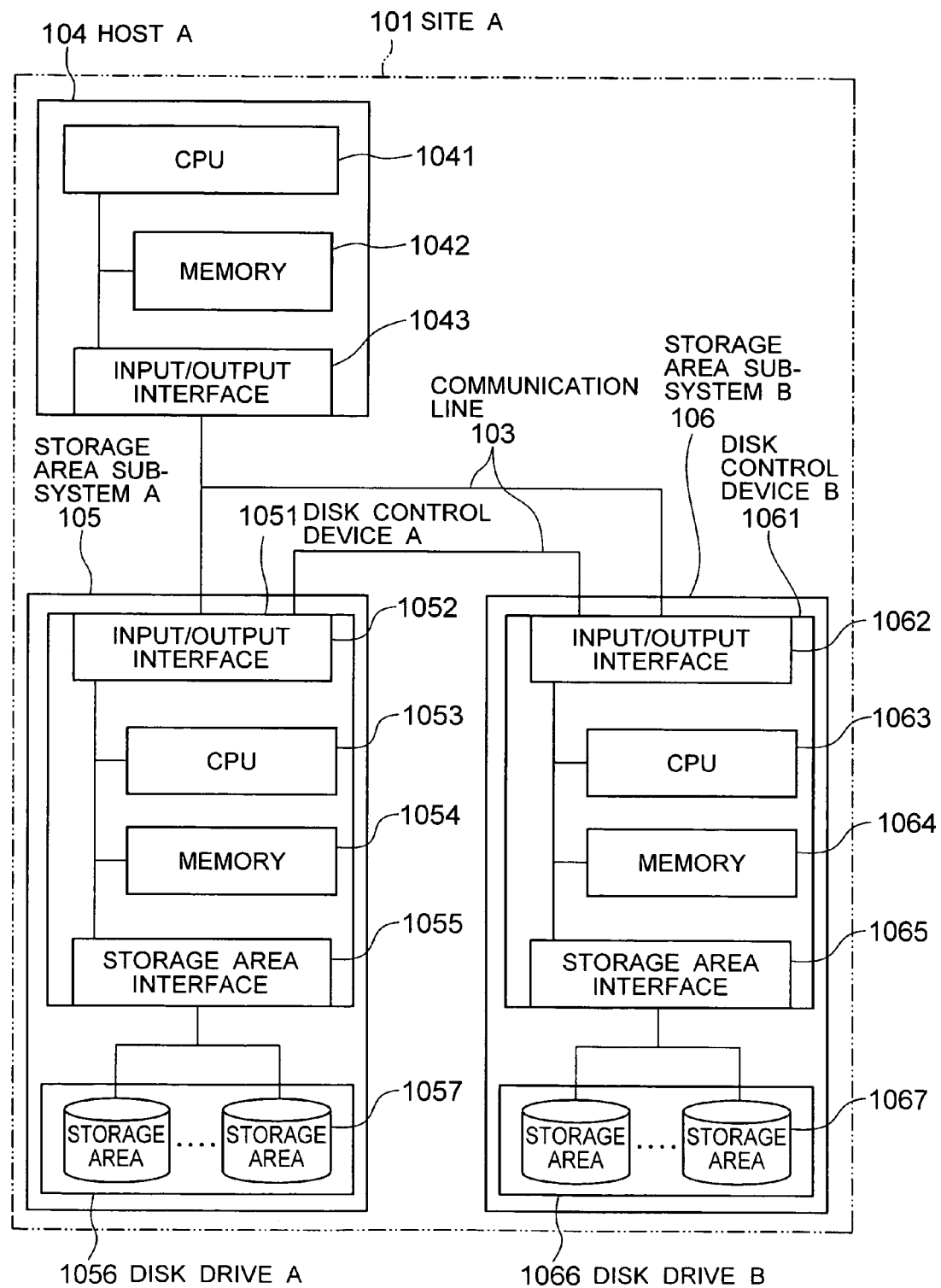
FIG. 19 is a block diagram showing the configuration of a storage area control system according to a second embodiment of the present invention.

FIG. 19 is a block diagram showing the configuration of a storage area control system according to the second embodiment of the invention. As shown in FIG. 19, the storage area control system of this embodiment comprises a site A 101 that is constituted by connecting, using a communication line 103, a host A 104; a storage area subsystem A 105, which that includes a disk control device A 1051 and a disk drive A 1056; and a storage area subsystem B 106, which includes a disk control device B 1061 and a disk drive B 1066.

Since the individual components of the storage area control system in FIG. 19 are substantially the same as those of the storage area control system of the first embodiment in FIG. 1, no explanation for them will be given. It should be noted, however, that programs stored in memories 1042, 1054 and 1064 of the host A 104, the disk control device A 1051 and the disk control device B 1061 differ from those for the first embodiment, and will be described later.

(Operation)

Figure 20:
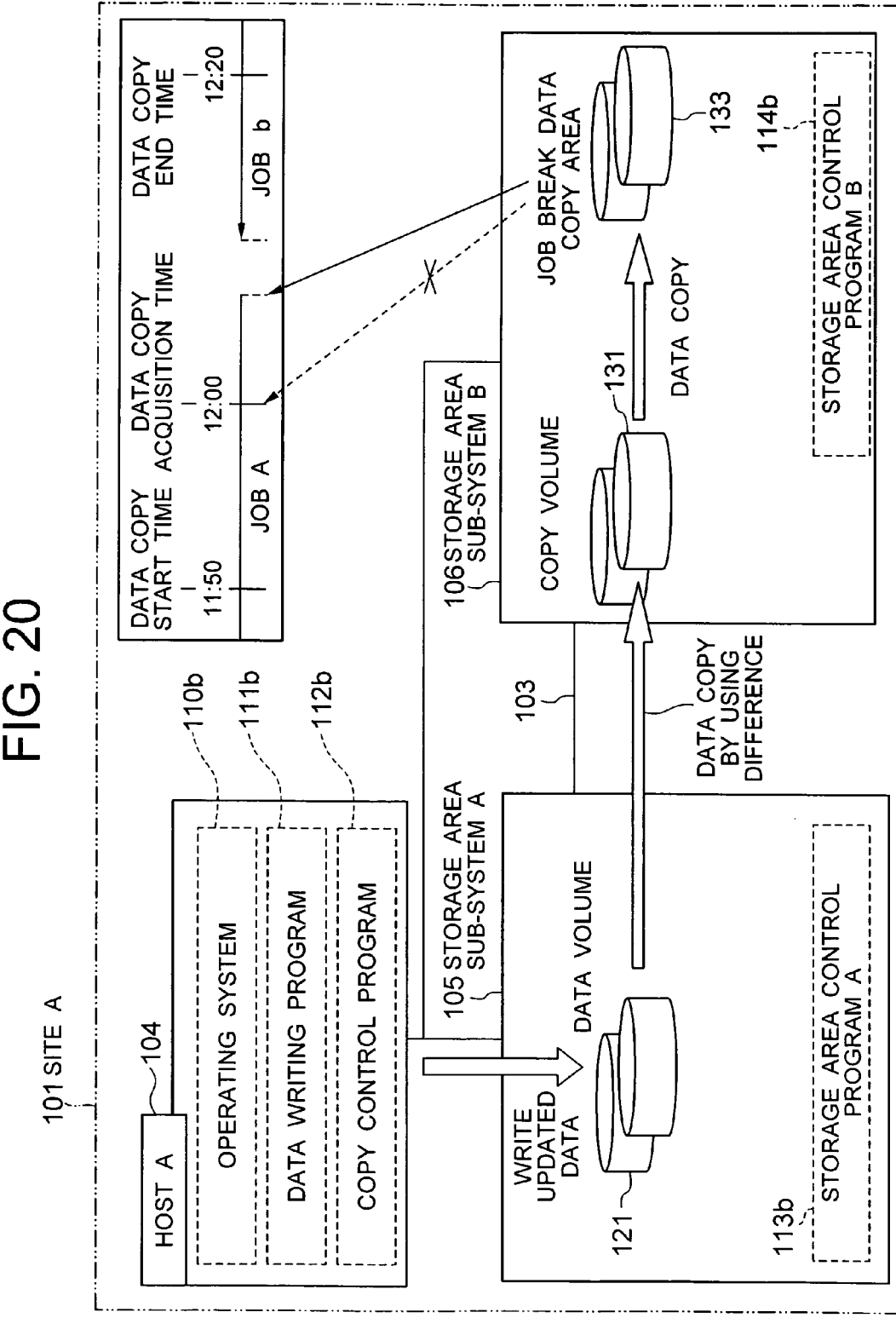
FIG. 20 is an explanatory diagram for explaining an operation performed to obtain a copy of data through synchronous copying and a copy of data through copying performed at a designated time.

FIG. 20 is a diagram for explaining the operation of the storage area control system in FIG. 19 to obtain a data copy through synchronous copying and to obtain a data copy at a designated time.

While referring to FIG. 20, explanation will be given for obtaining a data copy through synchronous copying and for obtaining a data copy at a designated time (see FIG. 19, as needed).

For the storage area control system of this embodiment, assume that a site that performs a process, such as a job, during the normal data copy management is a site A 101, a computer at this site is the host A 104, a copy source storage device is the storage area subsystem A 105 and a storage device at a copy destination is the storage area subsystem B 106.

When a copy control program 112*b* issues a synchronous copying instruction or a designated time data copy instruction, a data volume 121 in the storage area subsystem A 105 is copied to a copy volume 131 of the storage area subsystem B 106, or during a job break data copy area 133.

Here, synchronous copying is a process for synchronously copying, to the copy volume 131 of the storage area subsystem B 106, the updated contents of the data volume 121 of the storage area subsystem A 105, and for obtaining a data copy.

Through the synchronous copying process, the data in the data volume 121 of the storage area subsystem A 105 are always copied to the copy volume 131 of the storage area subsystem B 106. Since a data copy is synchronously obtained, the copy volume 131 has the same data contents as the data volume 121.

The designated time data copying process is a process in which, as well as in the first embodiment, data in the data volume 121 of the storage area subsystem A 105 is copied, at a designated time, to the job break data copy area 133 of the storage area subsystem B 106. Generally, a designated time for the acquisition of a data copy is the time at which a job, for example, is not being processed. Therefore, this data copy is a data copy obtained at a break between jobs or the like.

As in this embodiment, in a case wherein a data copy is obtained at a designated time, together with a synchronously obtained copy, the job break data copy area 133 is employed when failures are encountered both in the data volume 121 and the copy volume 131.

The data volume 121 of the storage area subsystem A 105 is stored in a storage area 1057 of the disk drive A 1056. The copy volume 131 and the job break data copy area 133 for the storage area subsystem B 106 are stored in individual storage areas 1067 on the disk drive B 1066.

In this embodiment, an operating system 110b, a data writing program 111b and a copy control program 112 are stored in the memory 1042 of the host A 104, and a CPU 1041 executes these programs. The operating system 110b processes input/output requests received from the data writing program 111b and the copy control program 112b. The data writing program 111b is a program that performs a job while writing data to the data volume 121 of the storage area subsystem A 105, and the copy control program 112b is a program that instructs the performance of synchronous copying, or of data copying performed at a designated time, as an input/output request.

A storage area control program A 113b is stored in the memory 1054 of the storage area subsystem A 105, and the data volume 121 is stored in a storage area 1057 of the disk drive A 1056. The storage area control program A 113b is a program that handles an input/output request received from the operating system 110b.

A storage area control program B 114b is stored in the memory 1064 of the storage area subsystem B 106, and the copy volume 131 and the job break data copy area 133 are stored in individual storage areas 1067 on the disk drive B 1066. The storage area control program B 114b is a program that handles an input/output request issued by the storage area control program A 113b.

Explanation will now be given for an overview of the synchronous copying operation performed when data are written by the data writing program 111b. It should be noted that this synchronous copying operation is a well known technique.

First, data written by the data writing program 111b of the host A 104 are to be processed by the operating system 110b. When the data writing program 111b issues a data writing instruction to the operating system 110b, updated data received from the data writing program 111b are set as updated data information 1103b (see FIG. 22), which will be described later, and are transmitted to the storage area subsystem A 105.

The storage area control program A 113b writes, to the data volume 121, the updated data received from the host A 104. At the same time, the storage area control program A 113b shifts a control process to the storage area control program B 114b and writes the updated data to the copy volume 131. When the writing to the data volume 131 in the storage area subsystem B 106 has been completed, the storage area control program A 113b notifies the operating system 110b of the host A 104 that the input/output has been completed.

When the synchronous copying is performed in this manner, the data volume 121 in the storage area subsystem A 105 can be recovered by using the copy volume 131, of the storage area subsystem B 106, when a failure is encountered in the data volume 121.

However, when a failure is also encountered in the copy volume 131 of the storage area subsystem B 106, or when data in the copy volume 131 can not be employed for the recovery, additional time will be required for the recovery. Thus, it is preferable that, at a designated time, a data copy of the data volume 121, in the storage area subsystem A 105, be obtained in the job break data copy area 133 of the storage area subsystem B 106.

At this time, it is a general rule that data should be copied during a time period in which the data writing program 111b, of the host A 104, is not operating, so that the data volume 121 can be recovered from the job break data copy area 133.

However, assume that the data writing program 111b is not ended upon the start of data copying, or that the data writing program 111b is erroneously started before the data copy start time. In this case, since at a designated time the data writing program 111b is still being operated, a data copy obtained is inappropriate for the job data to be handled by a computer program, because the job has not yet been completed. Therefore, the end of the execution of the data writing program 111b is detected, and the end nearest the designated time is determined to be the data copy execution time. In this manner, the data copy acquisition time can be optimized.

Explanation will now be given for an example method for the optimization of a designated time for the acquisition of a data copy.

Figures 21, 22:
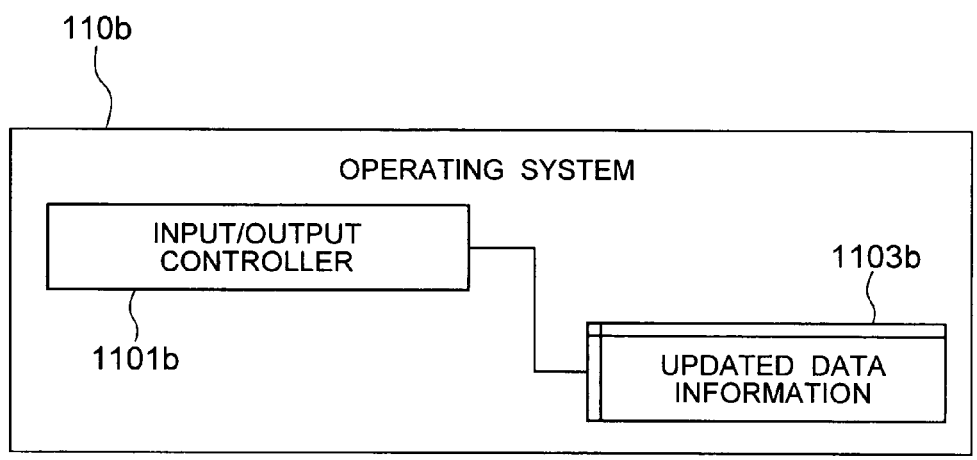
FIG. 21 is a functional block diagram showing an operating system.
FIG. 22 is a table showing sets of information entered as updated information.

FIG. 21 is a diagram showing example functional blocks required by the operating system 110b of the host A 104 for the optimization of the designated time for the acquisition of a data copy.

The operating system 110b in this embodiment comprises an input/output controller 1101b and updated data information 1103b. The input/output controller 1101b processes input/output requests received from the data writing program 111b and the copy control program 112b, and transmits the processing results to these programs.

An example for the updated data information 1103b is shown in a table in FIG. 22. As shown in FIG. 22, the updated data information 1103b includes entries for an update location 2301 and updated data 2302.

Figures 23, 24:
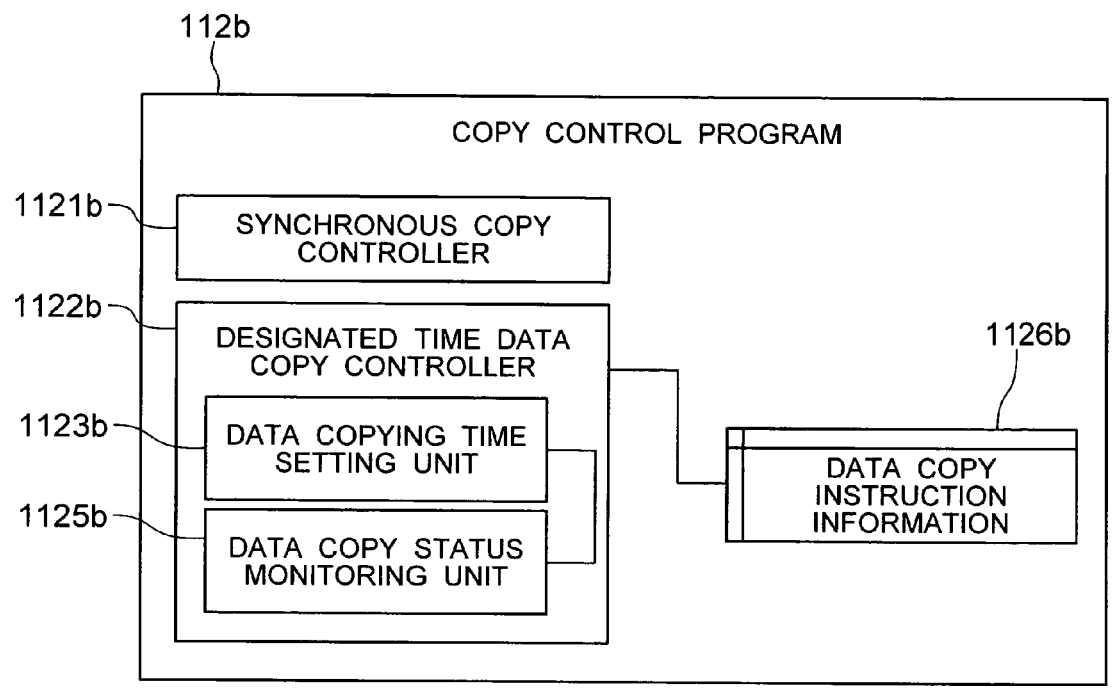
FIG. 23 is a functional block diagram showing a copy control program.
FIG. 24 is a table showing sets of information entered as data copy instruction information.

FIG. 23 is a diagram showing example functional blocks required for the copy control program 112b of the host A 104 for the optimization of a designated time for the acquisition of a data copy.

The copy control program 112b of this embodiment comprises: a synchronous copy controller 1121b, for instructing a synchronous copying process; a designated time data copy controller 1122b, for instructing the acquisition of a data copy at a designated time; and data copy instruction information 1126b.

The designated time data copy controller 1122*b* includes: a data copying time setting unit 1123*b*, for setting the data copy instruction information 1126*b*; and a data copy status monitoring unit 1125*b*, for monitoring the data copy status.

An example for the data copy instruction information 1126*b* is shown in a table in FIG. 24. As shown in FIG. 24, the data copy instruction information 1126*b* includes entries for a data copy start time 2411, a data copy acquisition time 2412, a data copy end time 2413, a blank I/O issuance interval 2414 and a job break period 2415.

In this embodiment, the storage area control program A 113*b* issues a blank I/O; however, the operating system 110*b* or the copy control program 112*b* may issue a blank I/O. Further, since the data copy instruction information 1126*b* is varied, depending on the time slot for data copy management and the characteristics of a job, an appropriate value is designated, for example, by a user or an operation management system when the copy control program 112*b* is activated.

Figures 25, 26:
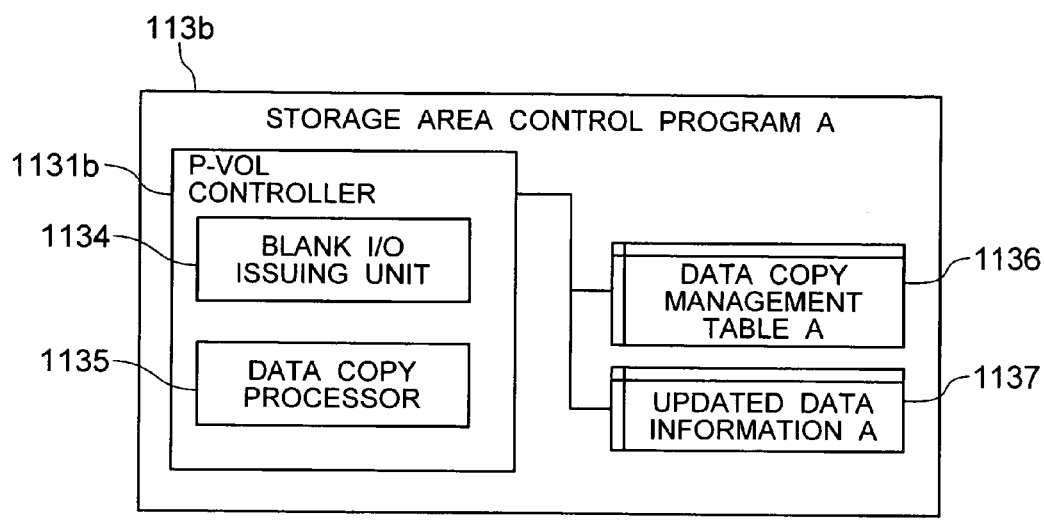
FIG. 25 is a functional block diagram showing a storage area control program A.
FIG. 26 is a diagram showing sets of information entered in data copy management table A.

FIG. 25 is a diagram showing example functional blocks required for the storage area control program A 113*b*, stored in the memory 1054 of the storage area subsystem A 105, for the optimization of a designated time for the acquisition of a data copy. The storage area control program A 113*b* processes a data input/output request received from the operating system 110*b*.

The storage area control program A 113 of this embodiment includes: a P-VOL controller 1131*b* that controls the disk drive A 1056, which is a primary copy source volume; a data copy management table A 1136; and updated data information A 1137. The P-VOL controller 1131*b* includes a blank I/O issuing unit 1134, which issues a blank I/O; and a data copy processor 1135, which copies, to the copy volume 131 of the storage area subsystem B 106, the updated data of the data volume 121 of the storage area subsystem A 105.

An example for the data copy management table A 1136 is shown in a table in FIG. 26. As shown in FIG. 26, the data copy management table A 1136 includes entries for a data copy start time 2511, a data copy acquisition time 2512, a data copy end time 2513, a blank I/O issuance interval 2514 and a job break period 2515.

Figures 27, 28:
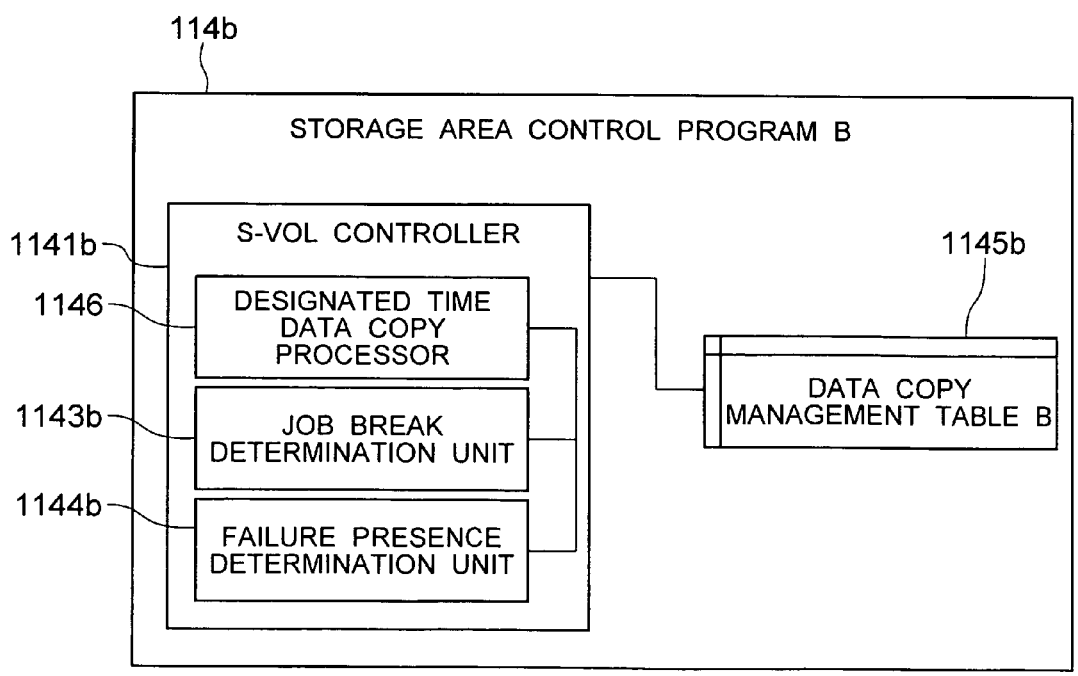
FIG. 27 is a table showing sets of information entered as updated information A.
FIG. 28 is a functional block diagram showing a storage area control program B.

Furthermore, an example for the updated data information A 1137 is shown in a table in FIG. 27. As shown in FIG. 27, the updated data information A 1137 includes entries for an update time 2601, an update location 2602 and updated data 2603. It should be noted that when a blank I/O is issued by the blank I/O issuing unit 1134, a record indicating the operation is ineffective is entered in the update location 2602 and as the updated data 2603, which are denoted by reference numeral 2611.

FIG. 28 is a diagram showing example functional blocks required for the storage area control program B 114*b* of the storage area subsystem B 106 for the optimization of a designated time for the acquisition of a data copy. The storage area control program B 114*b* processes an input/output request received from the remote I/O controller 1133 of the storage area control program A 113.

The storage area control program B 114*b* of this embodiment includes: an S-VOL controller 1141*b*, which controls the disk drive B 1066, a secondary volume at a copy destination; and a data copy management table B 1145*b*, and the S-VOL controller 1141*b* includes a designated time data copy processor 1146, a job break determination unit 1143*b*, and a failure presence determination unit 1144*b*.

When the copy control program 112*b* has issued an input/output request related to an instruction for the acquisition of a data copy at a designated time, in the storage area control program B 114*b*, a control process is shifted to the designated time data copy processor 1146, via the operating system 110*b* of the host A 104. Thereafter, the designated time data copy processor 1146 initiates a process for the acquisition, at the designated time, of a data copy.

The job break determination unit 1143*b* determines whether a break has occurred between jobs in order to optimize the designated time for the acquisition of a data copy.

The failure presence determination unit 1144*b* determines whether, when a data copy is to be acquired at a designated time, a failure is present in the host A 104 or in the storage area subsystem A 105 at the site A 101.

An example for the data copy management table B 1145*b* is shown in a table in FIG. 29. As shown in FIG. 29, the data copy management table B 1145*b* includes entries for a data copy start time 2711, a data copy acquisition time 2712, a data copy end time 2713, a blank I/O issuance interval 2714, a job break period 2715, a data copy status 2716, a data copy execution time 2717, a repetitive blank I/O acquisition count 2718 and a temporary data copy execution time 2719.

Explanation will now be given for a method for the optimization of a designated time for the acquisition of a data copy (see FIGS. 19 to 29, as needed).

Figure 30:
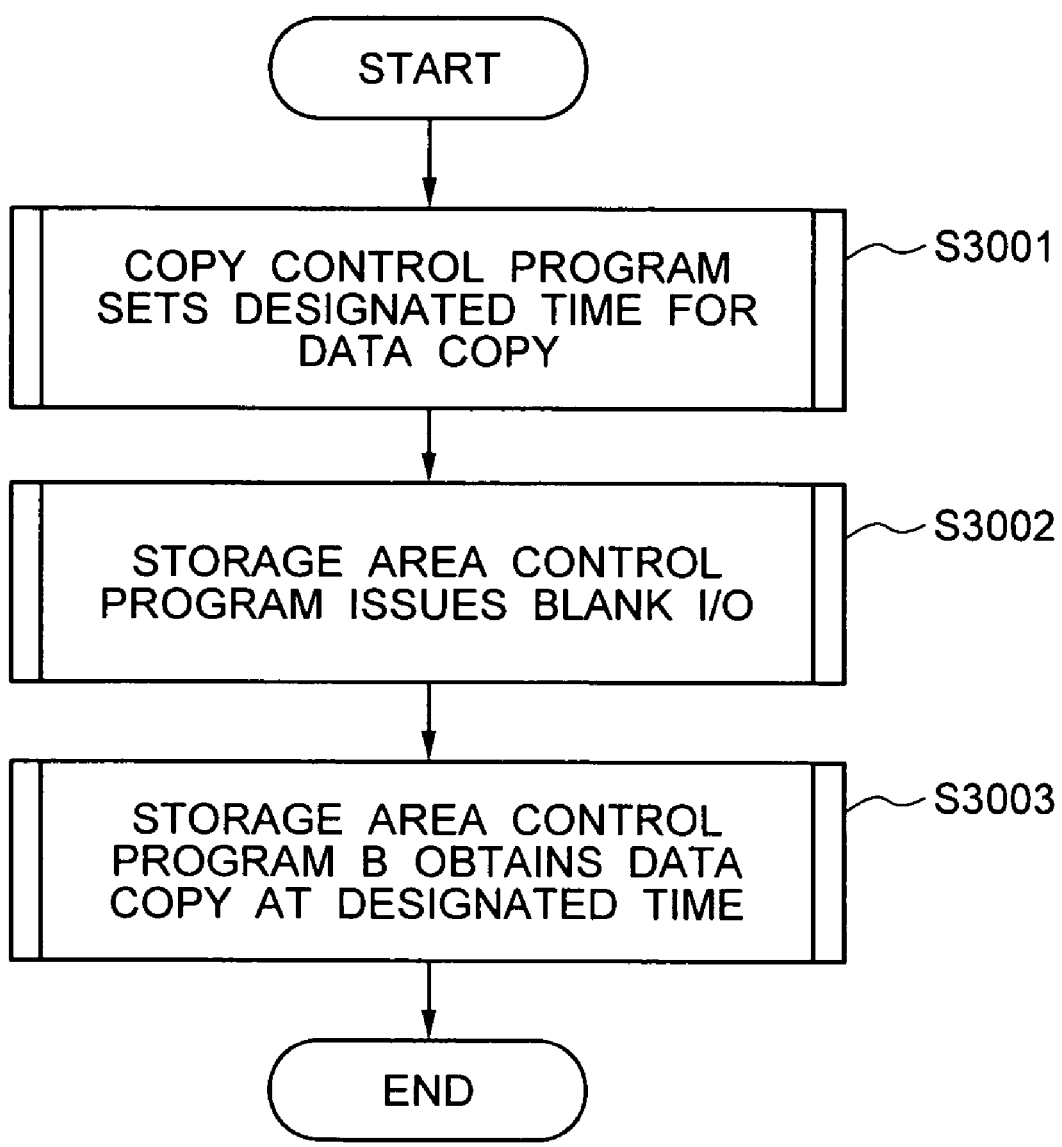
FIG. 30 is a flowchart showing an overview of the processing performed to acquire a data copy at a designated time.

FIG. 30 is a flowchart showing an overview of the process for acquiring a data copy at a designated time. As shown in FIG. 30, the process in this embodiment for acquiring a data copy at a designated time consists of "the copy control program sets a designated time for data copying (step S3001)", "the storage area control program A issues a blank I/O (step S3002)", and "the storage area control program B acquires a data copy at a designated time (step S3003)".

Figure 31:
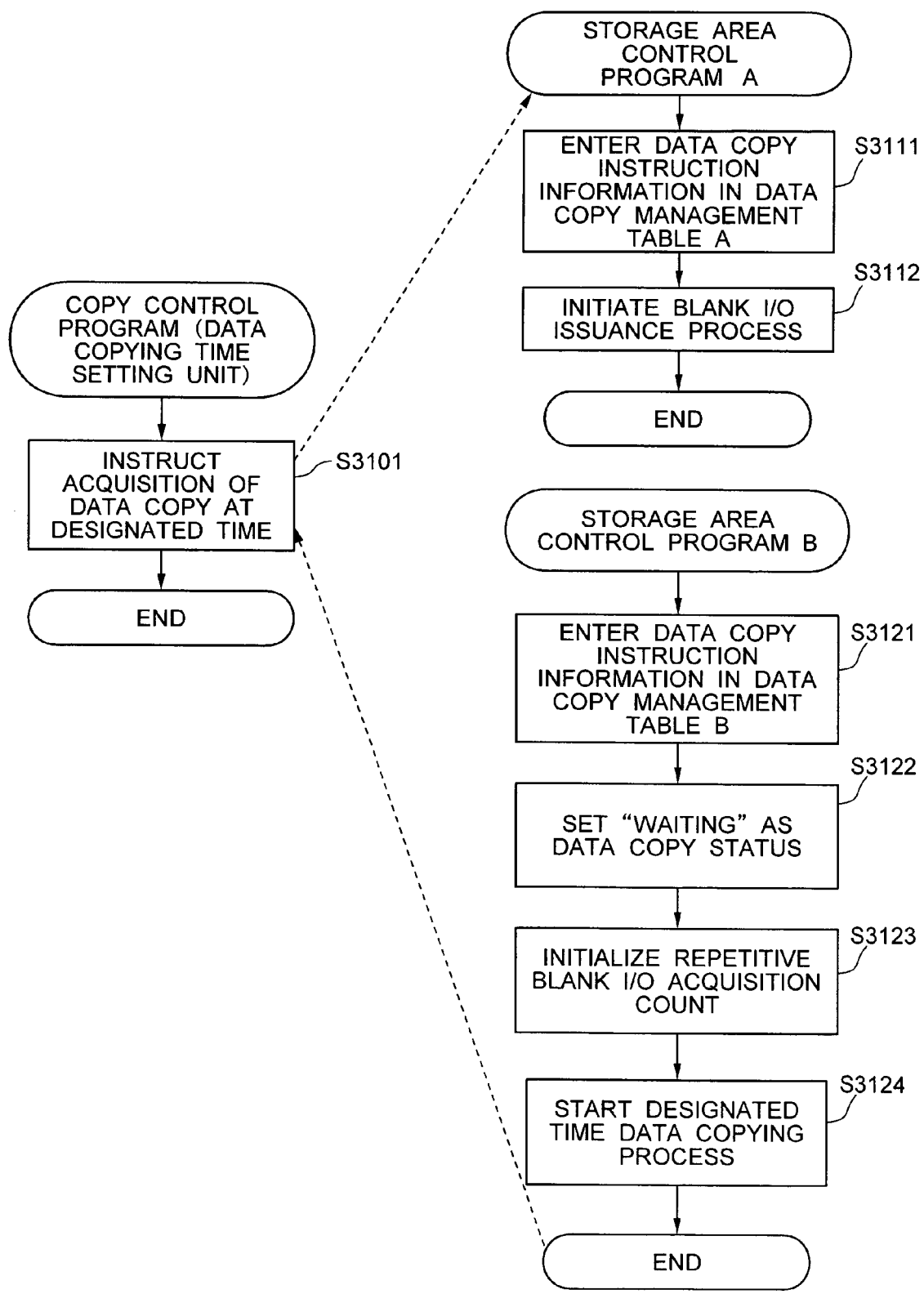
FIG. 31 is a flowchart showing a data copy time setting process.

First, a process performed by the copy control program, to set a designated time for data copying (step S3001), will be described in detail. FIG. 31 is a flowchart showing the data copying time setting process performed by the copy control program 112*b* of the host A 104.

In this case, the instruction for the acquisition of a data copy at a designated time is issued when a user, or an operation management system (not shown), activates the copy control program 112*b* before the data copy start time.

First, the copy control program 112*b* of the host A 104 selects data copy instruction information 1126*b* (see FIG. 24), and transmits an input/output request (data copy instruction information 1126*b*) to instruct the acquisition of a data copy at a designated time (step S3101). This data copy instruction information 1126*b* is transmitted through the operating system 110*b* of the host A 104 to the storage area control program A 113*b*. Thereafter, a control process is shifted to the storage area control program B 114*b* through the storage area control program A 113*b*.

The storage area control program A 113*b* of the storage area subsystem A 105 enters the received data copy instruction information 1126*b* in the data copy management table A 1136 (step S3111), and begins the blank I/O issuing process (step S3112). The blank I/O issuing process will be described later.

After the input/output request (the data copy instruction information 1126*b*) related to an instruction for acquisition of a data copy at the designated time has been obtained, the storage area control program B 114*b* of the storage area subsystem B 106 enters the data copy instruction information 1126*b* in the data copy management table B 1145*b* (see FIG. 29) (step S3121). Then, the storage area control program B 114*b* sets to "waiting" the value of the data copy status 2716 in the data copy management table B 1145*b* (step S3122), and initializes the repetitive blank I/o acquisition count 2718 (step S3123).

Then, the process for the acquisition of a data copy at a designated time is begun (step S3124). This process will be described later.

The values in the data copy instruction information 1126b (see FIG. 24) transmitted at step S3101 are to be designated when a user or an operation management system activates the copy control program 112b. The operation management system or the copy control program 112b may determine and set the optimal time.

An arbitrary time, following the time at which the input/output request for instructing the acquisition of a data copy at a designated time was issued, is entered in the individual entries for the data copy start time 2411, the data copy acquisition time 2412 and the data copy end time 2413 for the data copy instruction information 1126b. Further, the interval at which the blank I/O issuing unit 1134 of the storage area control program A 113b issued a blank I/O, during a period extending from the data copy start time 2411 to the data copy end time 2413, is entered in the blank I/O issuance interval 2414.

As described above, in the job break period 2415, such a value is entered that, when the data writing program 111b has not issued an updated I/O during a period equivalent to this value, this period is regarded as the break between jobs. Therefore, when the data writing program 111b is to be sequentially executed, the interval equivalent to the designated value should be obtained before and after the execution of the data writing program 111b. Further, in a case wherein, when during the execution of the data writing program 111b an updated I/O is not issued for a period equivalent to this designated value, this period is regarded as the end of a job, and, thus, for example, the data writing program 111b should periodically output a log to the data volume 121 of the storage area subsystem A 105.

Explanation will now be given for the blank I/O issuance operation, performed by the storage area control program A 113b of the storage area subsystem A 105 when an instruction for the acquisition of a data copy at a designated time is issued, and a data copy operation, performed by the storage area control program A 113b when the operating system 110b of the host A 104 receives a data writing request.

Figure 32:
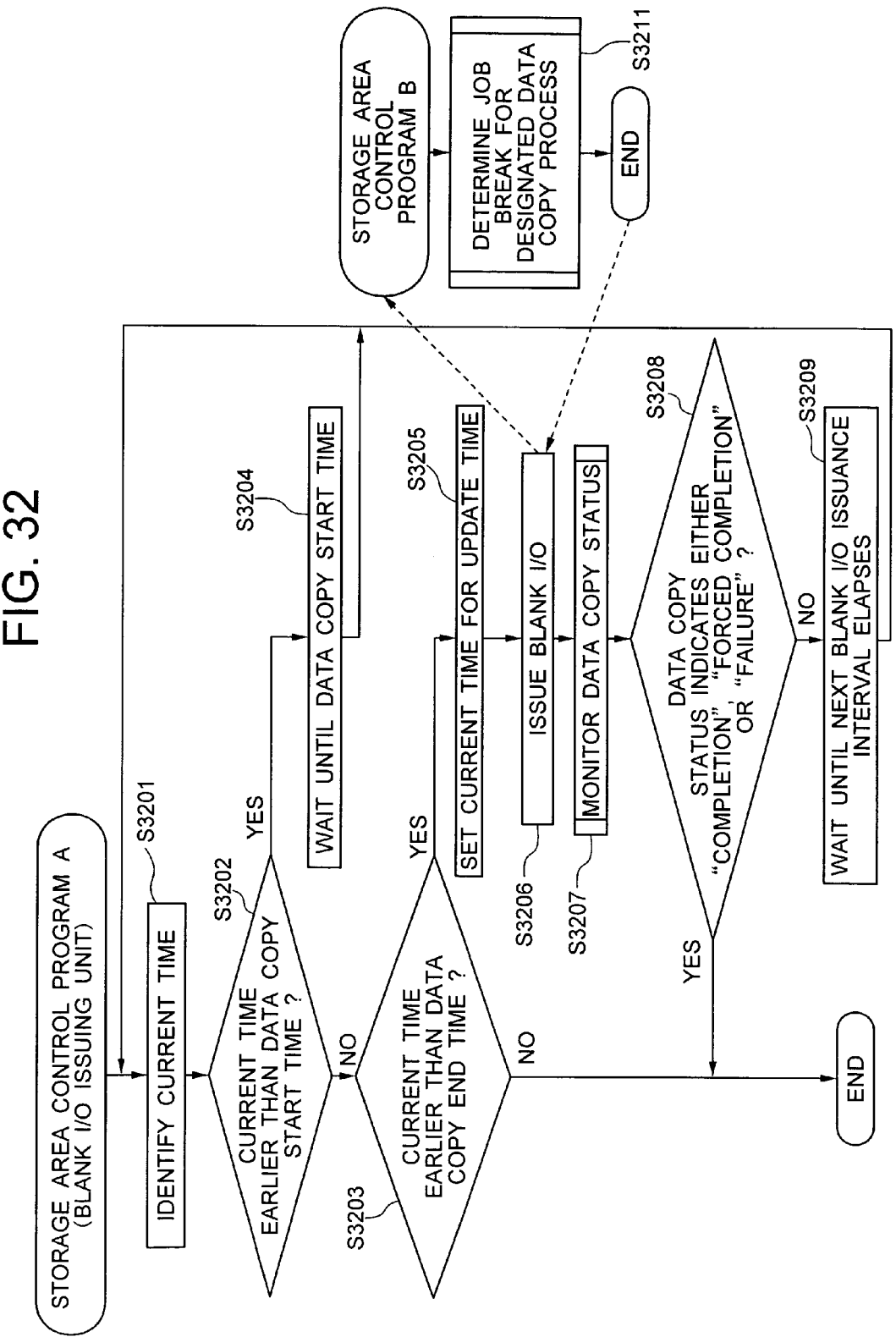
FIG. 32 is a flowchart showing a blank I/O issuing process performed by the storage area control program A.

FIG. 32 is a flowchart showing the blank I/O issuance process performed by the storage area control program A 113b.

First, when an instruction for the acquisition of a data copy at a designated time is issued, the storage area control program A 113b identifies the current time by referring to the relationship between the current time and the data copy start time 2411 and the data copy end time 2413 included in the data copy instruction information 1126b (see FIG. 24) (step S3201). The storage area control program A 113b determines whether the current time is earlier than the data copy start time (step S3202), and when the current time is earlier than the data copy start time (YES at step S3202), waits until the data copy start time is reached (step S3204), and then, returns to step S3201. When the current time is not earlier than the data copy start time (NO at step S3202), the storage area control program A 113b determines whether the current time is earlier than the data copy end time 2413 (step S3203).

When, at decision step S3203, the current time is not earlier than the data copy end time (NO at step S3203), the processing is terminated.

When the current time is earlier than the data copy end time (YES at step S3203), the storage area control program A 113b enters the current time in the update time 2601 for the data copy management table A 1136 (step S3205), issues a blank I/O to the storage area control program B 114b at the blank I/O issuance interval 2514 that is designated (step S3206), and monitors the data copy status (step S3207).

It should be noted that a blank I/O issued at step S3206 is transmitted to the storage area control program B 114b of the storage area subsystem B 106, and is employed for the job break determination process (step S3211) performed during the data copy processing at a designated time that will be described later. Further, the data copy status monitoring process at step S3207 will be described in detail later.

Then, the storage area control program A 113b determines whether the data copy status 2716 in the data copy management table B 1145b of the storage area subsystem B 106 indicates "completion", "forced completion" or "failure" (step S3208).

Figure 33:
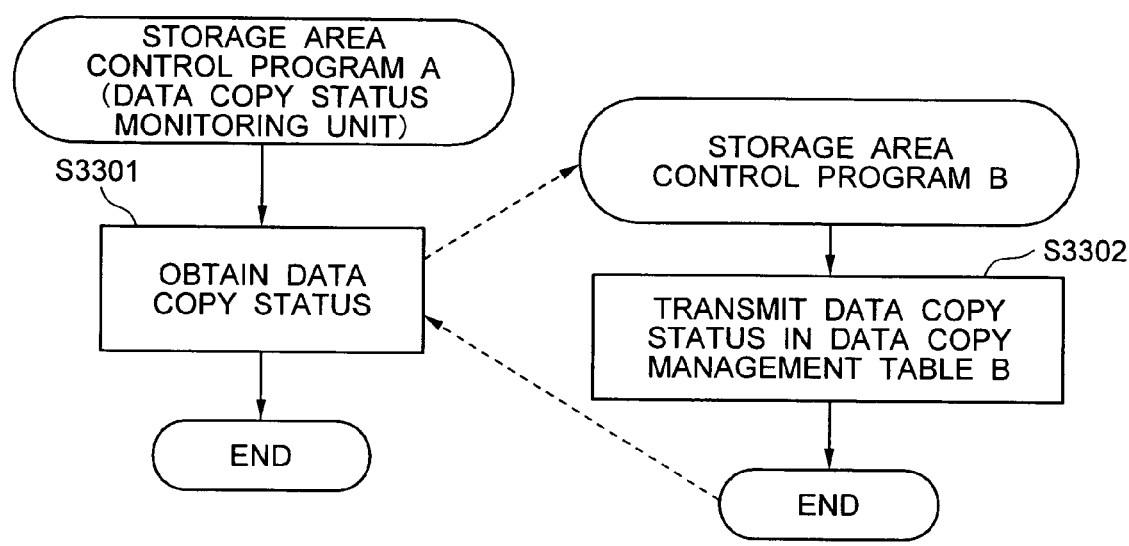
FIG. 33 is a flowchart showing an inquiry process for a data copy status.

FIG. 33 is a flowchart showing the processing for requesting the storage area control program B 114b for the data copy status 2716. First, the storage area control program A 113b forwards a request to the storage area subsystem B 106 for the transmission of the data copy status 2716 in the data copy management table B 1145b (see FIG. 29). Upon receiving this request, the storage area control program B 114b transmits to the storage area control program A 113b the data copy status 2716 in the data copy management table 1145b (step S3302). Then, the storage area control program A 113b obtains the data copy status 2716 from the storage area control program B 114b (step S3301).

Referring again to FIG. 32, when, at step S3208, the data copy status 2716 indicates either "completion", "forced completion" or "failure" (YES at step S3208), the processing is terminated. When the data copy status 2716 does indicate any of them (NO at step S3208), the storage area control program A 113b waits for the next I/O a period equivalent to the designated blank I/O interval 2414 (step S3209). Then, program control returns to step S3201.

Through the above described processing, the functions generally provided for the operating system 110b can be employed for the waiting process that continues until the data copy start time is reached (step S3204) and the waiting process that continues until a period designated in the blank I/O issuance interval 2414 is reached (step S3209).

Figure 34:
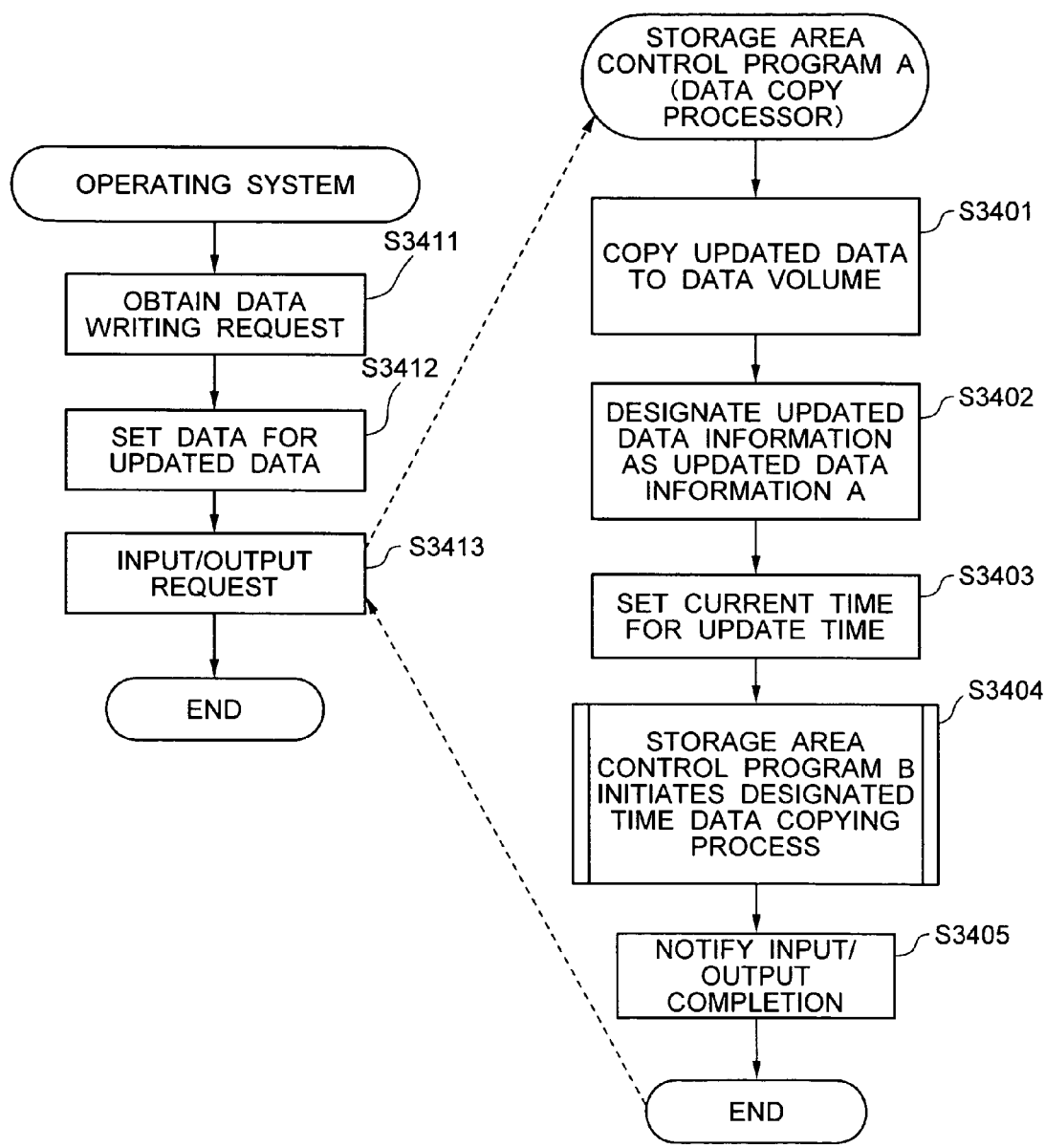
FIG. 34 is a flowchart showing a data copy acquisition process performed by the storage area control program A.

FIG. 34 is a flowchart showing the data copy acquisition processing performed by the storage area control program A 113b.

When the operating system 110b of the host A 104 receives a data writing request (step S3411), the operating system 110b updates the updated data information 1103b (see FIG. 22) (step S3412), and transmits an input/output request to the storage area control program A 113b in the storage area subsystem A 105 (step S3413). At this time, the updated data information 1103b is transmitted as input information.

Upon receiving the input/output request that includes the updated data information 1103b, the storage area control program A 113b copies to the data volume 121 the updated data 2302 of the updated data information 1103b (step S3401), and enters the updated data information 1103b as updated data information A 1137 (step S3402).

Further, the storage area control program A 113b enters the current time in the update time 2601 of the updated data information A 1137 (step S3403), and activates the designated time data copy processor 1146 of the storage area control program B 114b (step S3404).

Thereafter, the designated time data copy processor 1146 copies the updated data to the copy volume 131, and at a designated time, copies the data volume 121 of the storage area subsystem A 105 to the job break data copy area 133. The designated time data copying process will be described in detail later. When the storage area control program A 113b has completed the designated time data copying process, the storage area control program A 113*b* transmits an input/output completion notification to the operating system 110*b* of the host A 104 (step S3405), and the control process is returned to the operating system 110*b*.

Next, explanation will be given for the operation performed by the storage area control program B 114*b*, of the storage area subsystem B 106, when a designated time data copy instruction is issued.

FIGS. 35A to 35F are flowcharts showing the processing performed by the storage area control program B 114*b*, of the storage area subsystem B 106, for the acquisition of a data copy at a designated time.

First, the storage area control program B 114*b* obtains the updated data information A 1137 (see FIG. 27) from the storage area control program A 113*b*, of the storage area subsystem A 105 (step S3501), and performs a process to determine whether a failure is present (step S3502). Through this process, the storage area control program B 114*b* determines whether a failure has been encountered (step S3503). When a failure has been encountered (YES at step S3503), the storage area control program B 114*b* enters "failure" in the data copy status 2716 of the data copy management table B 1145*b* (see FIG. 29) (step S3504), and halts the data copy acquisition.

At this time, when a break between jobs is detected before a failure is encountered, data copies that were obtained during the break, which was detected before the failure was encountered, are present in the job break data copy area 133.

When a job break is not detected, and when updated data information A 1137 was not obtained during the elapse of the data copy acquisition time 2712, before the failure was detected, the data copy obtained at the previous designated time 2712 is retained. When updated data information A 1137 is obtained during the elapse of the data copy acquisition time 2712, a data copy obtained at the data copy acquisition time 2712 is present.

Figure 36:
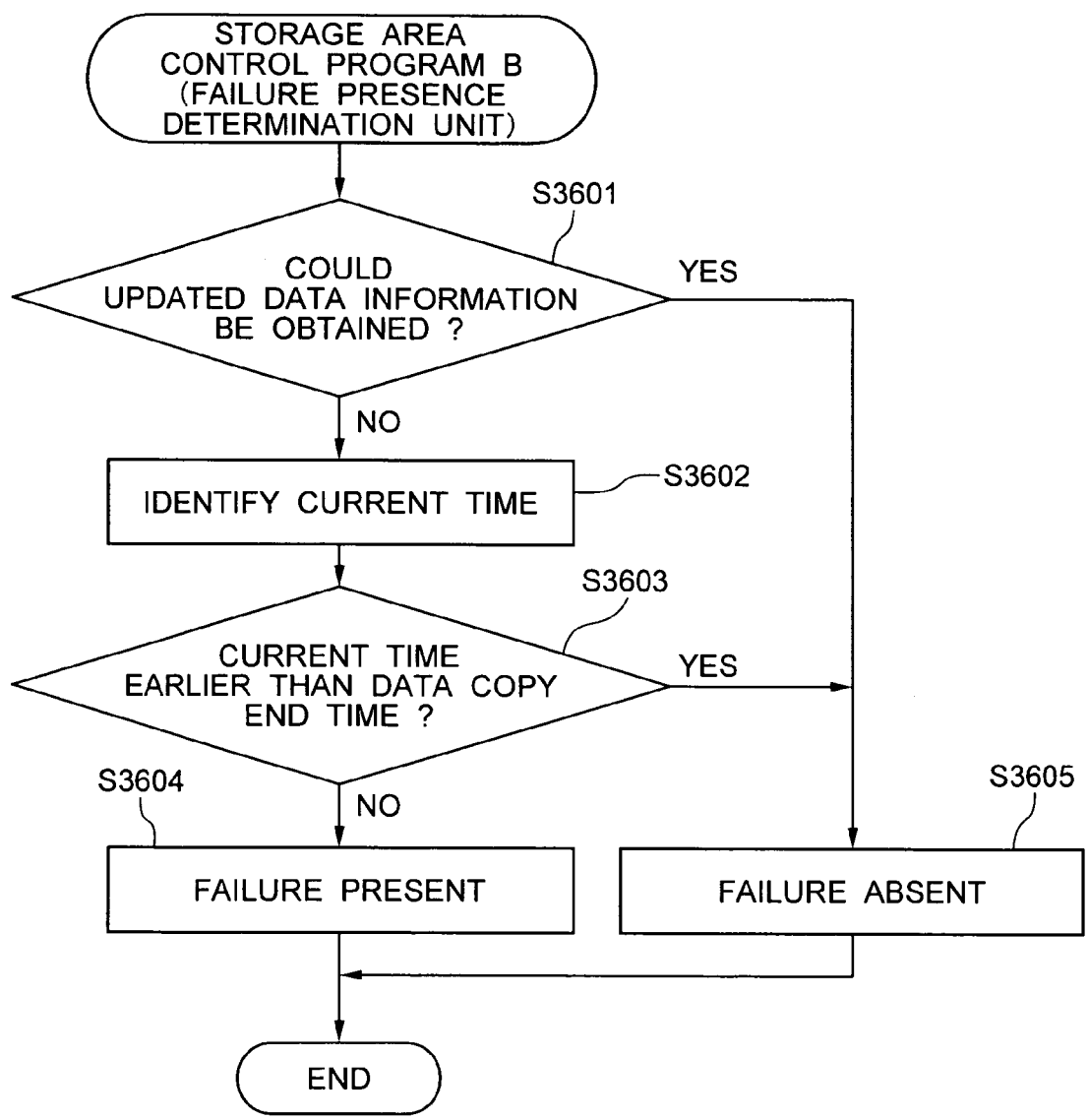
FIG. 36 is a flowchart showing a process for determining whether a failure has been encountered.

FIG. 36 is a detailed flowchart for the process performed at step S3502 to determine the occurrence of a failure. When updated data information A 1137 can not be obtained from the operating system 110*b* of the host A 104 after the data copy end time 2713 for the data copy management table B 1145*b* (see FIG. 29) has elapsed, this case is regarded as a failure. Since the processing shown in FIG. 36 is substantially the same as the processing in FIG. 16, for the first embodiment, to determine whether a failure is detected, no detailed explanation will be given.

On the other hand, when a failure is not encountered at step S3503 (NO at step S3503), the storage area control program B 114*b* determines whether the updated data information A 1137 could be obtained at S3501 (step S3505). When the updated data information A 1137 could not be obtained (NO at step S3505), the storage area control program B 114*b* returns to step S3501 for the acquisition of the updated data information A 1137. When the updated data information A 1137 could be obtained at step S3501 (YES at S3505), the storage area control program B 114*b* determines whether the update time 2601 for the updated data 2603 in the updated data information A 1137 (see FIG. 27) that is obtained is earlier than the data copy start time 2711 in the data copy management table B 1145*b* (see FIG. 29) (step S3506).

Figure 35A:
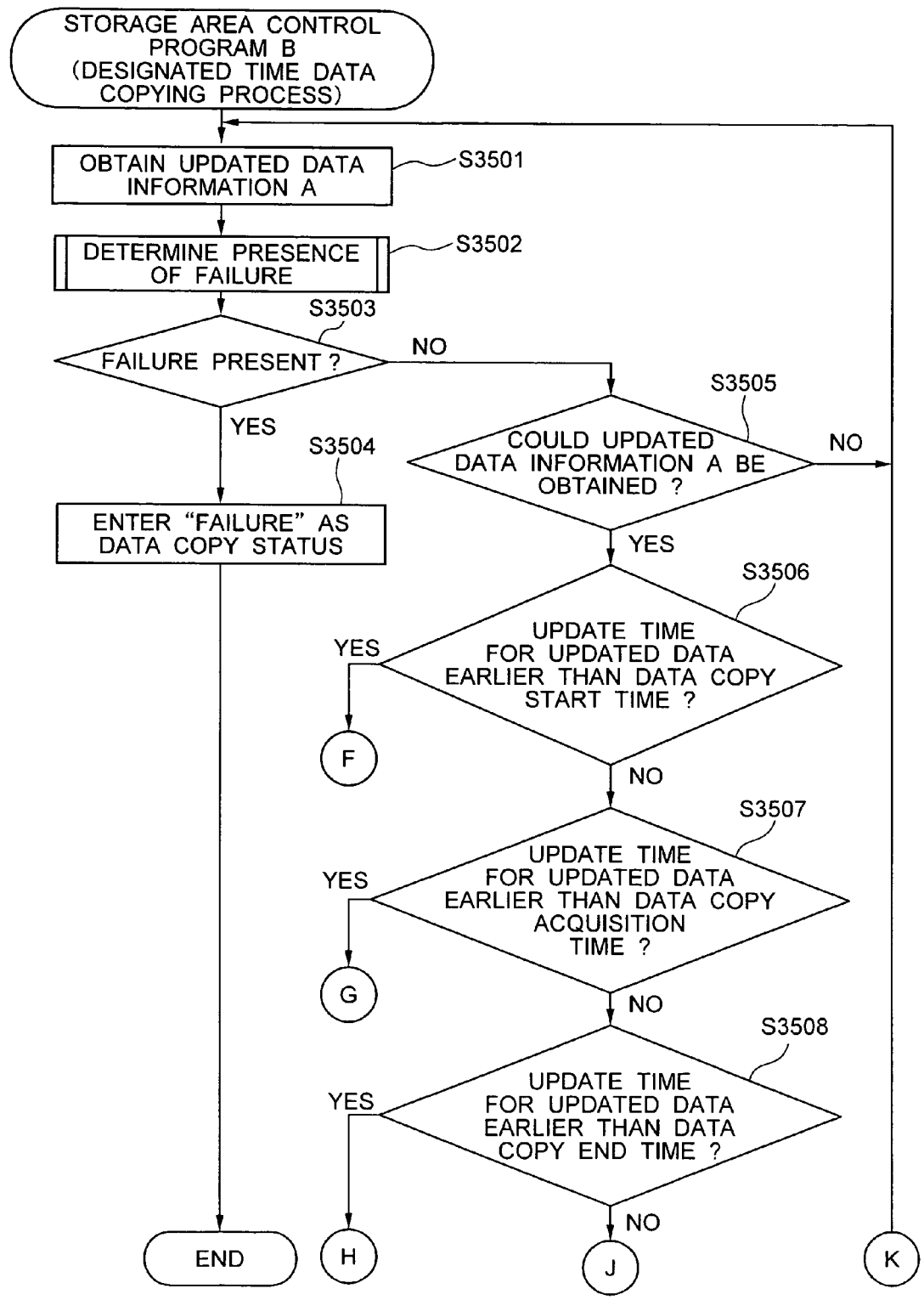
FIG. 35A is a flowchart showing a process for the acquisition of a data copy at a designated time.
Figure 35B:
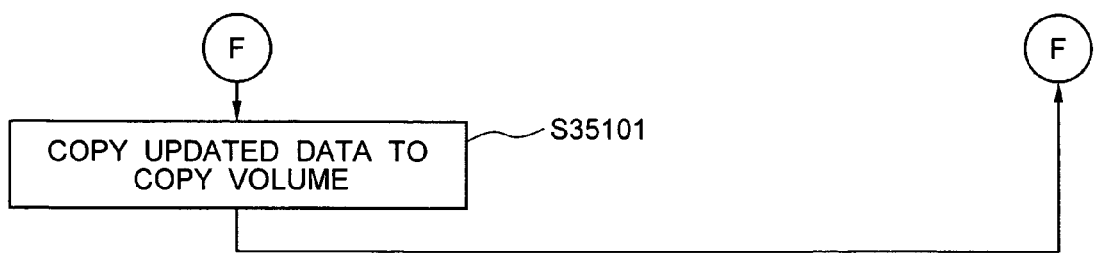
FIG. 35B is a flowchart showing the process for the acquisition of a data copy at a designated time.

When the update time 2601 is earlier than the data copy start time 2711 at step S3506 (YES at step S3506), program control is shifted, via terminal F, to FIG. 35B, and the storage area control program B 114*b* copies the updated data to the copy volume 131 (step S35101). Thereafter, program control is returned, via terminal K, to the process for the acquisition of the updated data information A 1137 in FIG. 35A (step S3501).

When, at step S3506, the update time 2601 for the updated data 2603 of the obtained updated data information A 1137 is not earlier than the data copy start time 2711 (NO at step S3506), the storage area control program B 114*b* determines whether the update time 2601 is earlier than the data copy acquisition time 2712 in the data copy management table B 1145*b* (see FIG. 27) (step S3507).

Figure 35C:
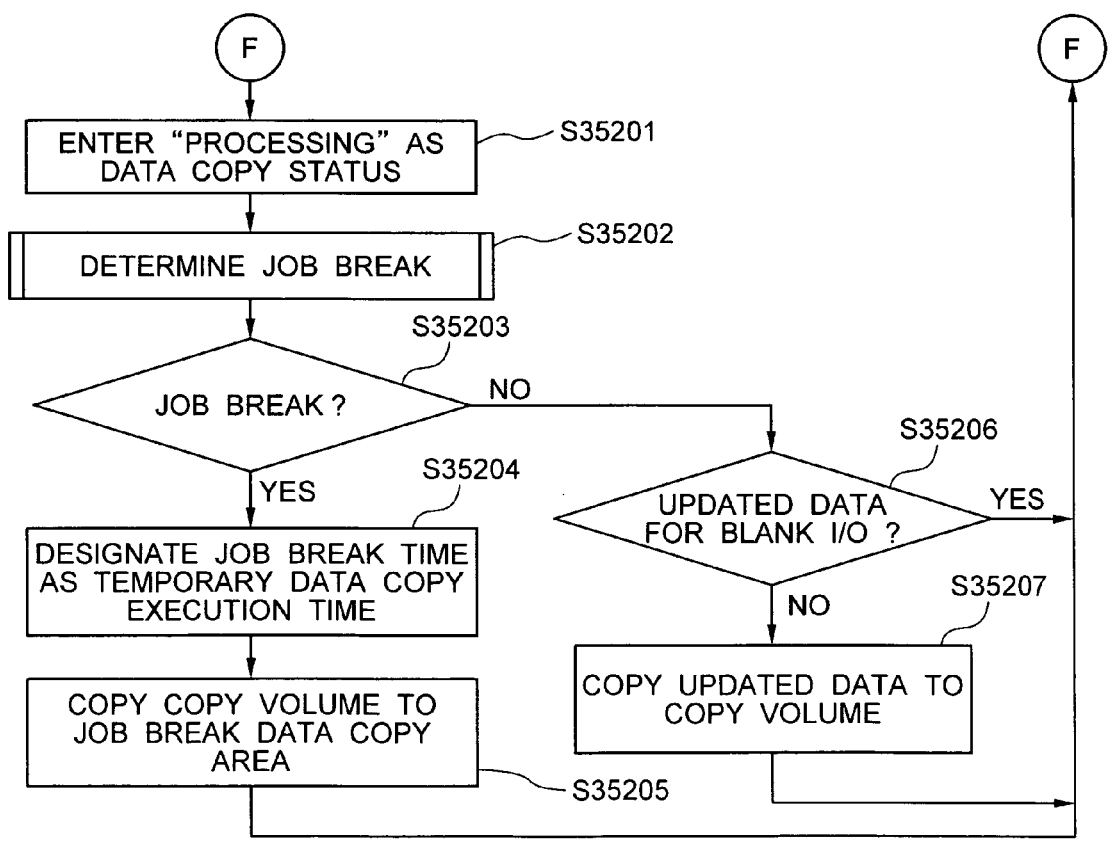
FIG. 35C is a flowchart showing the process for the acquisition of a data copy at a designated time.

When, at step S3507, the update time 2601 is earlier than the data copy acquisition time 2712 (YES at step S3507), program control is shifted, via terminal G, to FIG. 35C. The storage area control program B 114*b* enters "processing", as the data copy status 2716, in the data copy management table B 1145*b* (see FIG. 29) (step S35201), performs a job break determination process (step S35202), and determines whether the break between jobs or the like is detected (step S35203).

When a break between jobs or the like is detected at step S35203 (YES at step S35203), the storage area control program B 114*b* sets the job break time, which is determined at step S35202, in the temporary data copy execution time 2719 of the data copy management table B 1145*b* (see FIG. 29) (step S35204), and copies the copy volume 131 to the job break data copy area 133 (step S35205). Then, program control returns, via terminal K, to the process in FIG. 35A for the acquisition of the updated data information A 1137 (step S3501).

When a break between jobs or the like is not detected at step S35203 (NO at step S35203), the storage area control program B 114*b* determines whether the updated data information A 1137 (see FIG. 27), which was obtained at step S3501 in FIG. 35A, is the updated data information A 1137 for a blank I/O (step S35206). When the updated data information A 1137 is for a blank I/O (YES at step S35206), program control is returned directly, via terminal K, to the process in FIG. 35A for the acquisition of the updated data information A 1137 (step S3501). When the updated data information A 1137 is not for a blank I/O (NO at step S35206), this updated data information A 1137 is copied to the copy volume 131 (step S35207), and then, program control is returned, via terminal K, to the process in FIG. 35A for the acquisition of the updated data information A 1137 (step S3501).

The performance of the determination made at step S35206, to decide whether the updated data information A 1137 is for a blank I/O, depends on whether the update location 2602 and the updated data 2603 are ineffective.

When, at step S3507, the update time 2601 for the updated data 2603 of the updated data information A 1137 is not earlier than the data copy acquisition time 2712 (NO at step S3507), the storage area control program B 114*b* determines whether the update time 2601 is earlier than the data copy end time 2713 for the data copy management table B 1145*b* (see FIG. 29) (step S3508).

Figure 35D:
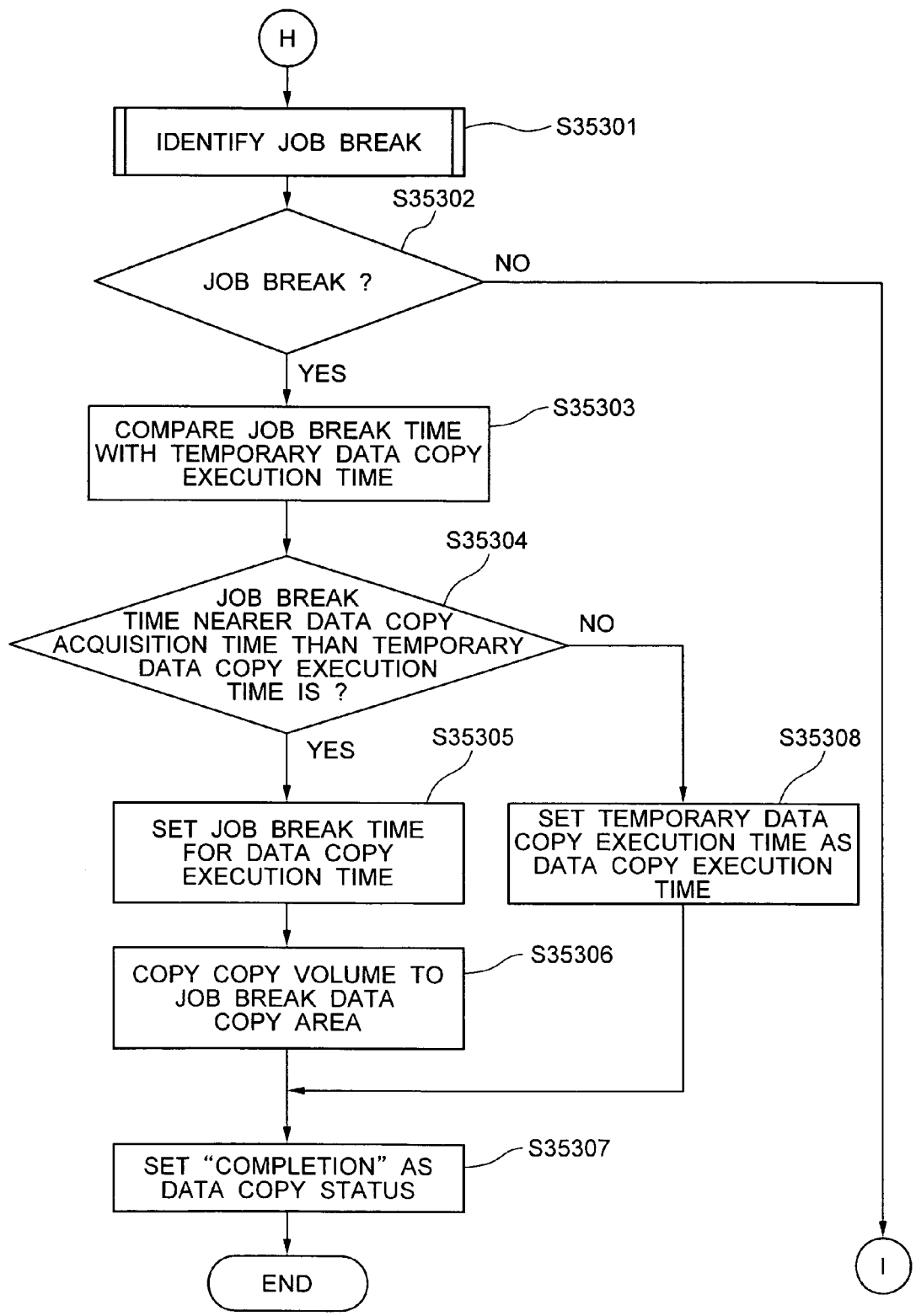
FIG. 35D is a flowchart showing the process for the acquisition of a data copy at a designated time.

When, at step S3508, the update time 2601 is earlier than the data copy end time 2713 (YES at step S3508), program control is shifted, via terminal H, to FIG. 35D. The storage area control program B 114*b* performs a job break determination process (step S35301), and the results of which are used to detect a break between jobs or the like (step S35302).

When a break between jobs or the like is detected at step S35302 (YES at step S35302), the storage area control program B 114*b* compares the time for the detected job break with the temporary data copy execution time 2719 of the data copy management table B 1145*b* (see FIG. 29) (step S35303), and determines whether the job break time is nearer than the temporary data copy execution time 2719 to the data copy acquisition time 2712 in the data copy management table B 1145b (see FIG. 29) (step S35304).

When at step S35304 the job break time is nearer (YES at step S35304), the storage area control program B 114b sets the job break time, detected at step S35301, for the data copy execution time 2717 in the data copy management table B 1145b (see FIG. 29) (step S35305), and copies the copy volume 131 to the job break data copy area 133 (step S35306).

When at step S35304 the temporary data copy execution time 2719 is nearer (NO at step S35304), the storage area control program B 114b enters the temporary data copy execution time 2719 as the data copy execution time 2717 in the data copy management table B 1145b (step S35308).

The storage area control program B 114b enters "completion", as the data copy status 2716, in the data copy management table B 1145b (see FIG. 29) (step S35307). The processing is thereafter terminated.

Figure 35E:
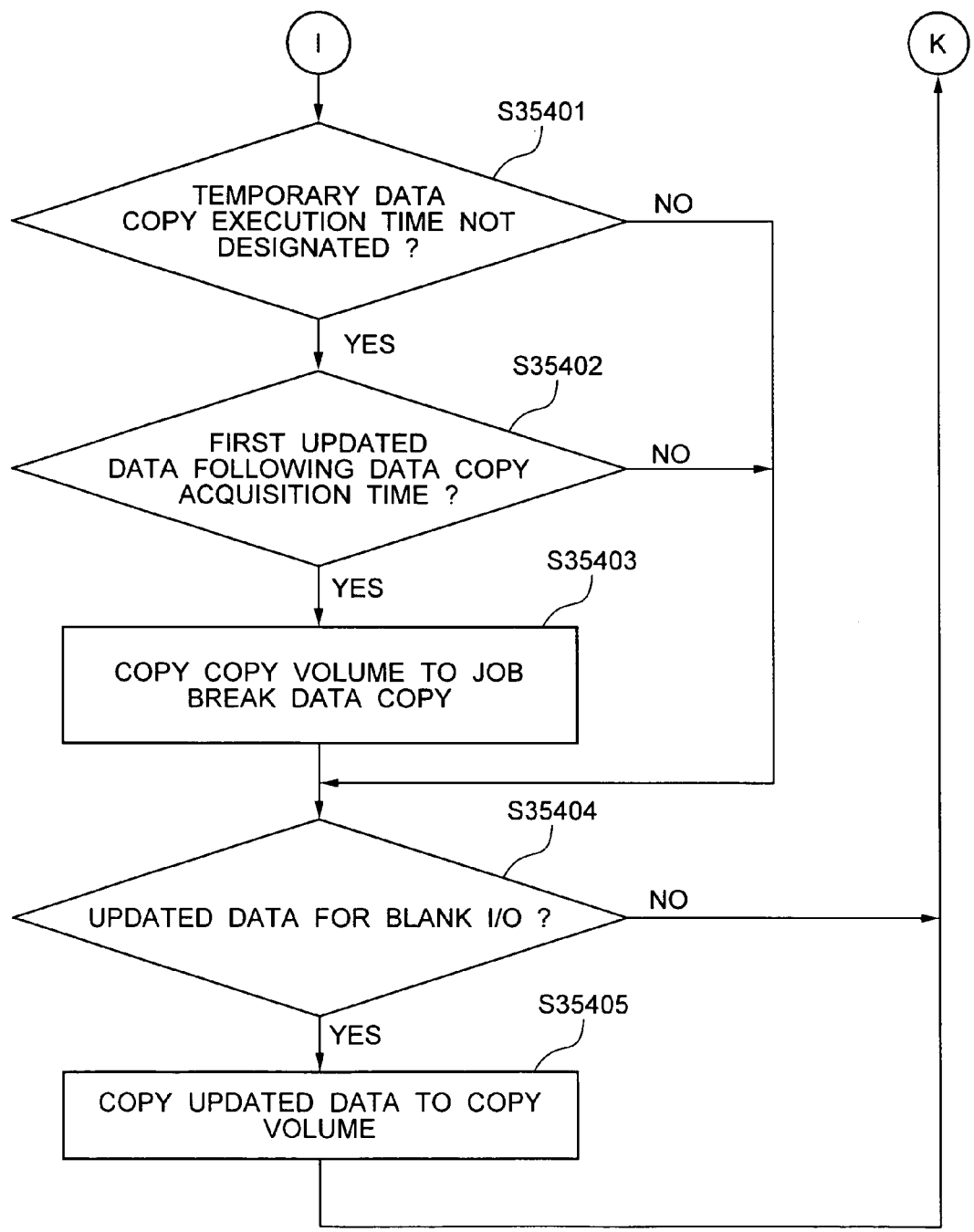
FIG. 35E is a flowchart showing the process for the acquisition of a data copy at a designated time.

When a break between jobs or the like can not be detected at step S35302 (NO at step 35302), program control is shifted from terminal I to FIG. 35E, and the storage area control program B 114b determines whether the temporary data copy execution time 2719 in the data copy management table B 1145b has not yet been designated (step S35401). When the temporary data copy execution time 2719 has not yet been designated (YES at step S35401), the storage area control program B 114b determines whether the data is the first updated data obtained following the elapse of the data copy acquisition time (YES at step S35402).

When, at step S35402, the data is the first updated data obtained following the elapse of the data copy acquisition time (YES at step S35402), the copy volume 131 is copied to the job break data copy area 133, because this copying process has not yet been performed relative to the data for the copy volume 131 and the job break data copy area 133 (step S35403).

When the decision at step S35401 or S35402 is NO, the process at step S35403 is skipped.

Sequentially, thereafter, the storage area control program B 114b determines whether the updated data information A 1137 (see FIG. 27), obtained at step S3501 in FIG. 35A, is the updated data information 2603 for a blank I/O (step S35404). When the updated data information A 1137 is for a blank I/O (YES at step S35404), the storage area control program B 114b returns directly to the process (step S3501) in FIG. 35A, for the acquisition of the updated data information A 1137. When the updated data information A 1137 is not for a blank I/O (NO at step S35404), the storage area control program B 114b copies the updated data 2603 to the copy volume 131 (step S35405), and then returns, via terminal K, to the process (step S3501) in FIG. 35A for the acquisition of the updated data information A 1137.

When, at step S3508, the update time 2601, for the updated data 2603, is not earlier than the data copy end time 2713 (NO at step S3508), program control is shifted, via terminal J, to FIG. 35F. The storage area control program B 114b then designates, as the data copy execution time 2717, the data copy acquisition time 2712 in the data copy management table B 1145b (see FIG. 19) (step S35501), and enters "forced completion" in the data copy status 2716 (step S35502). Then, the processing is terminated.

Figure 37:
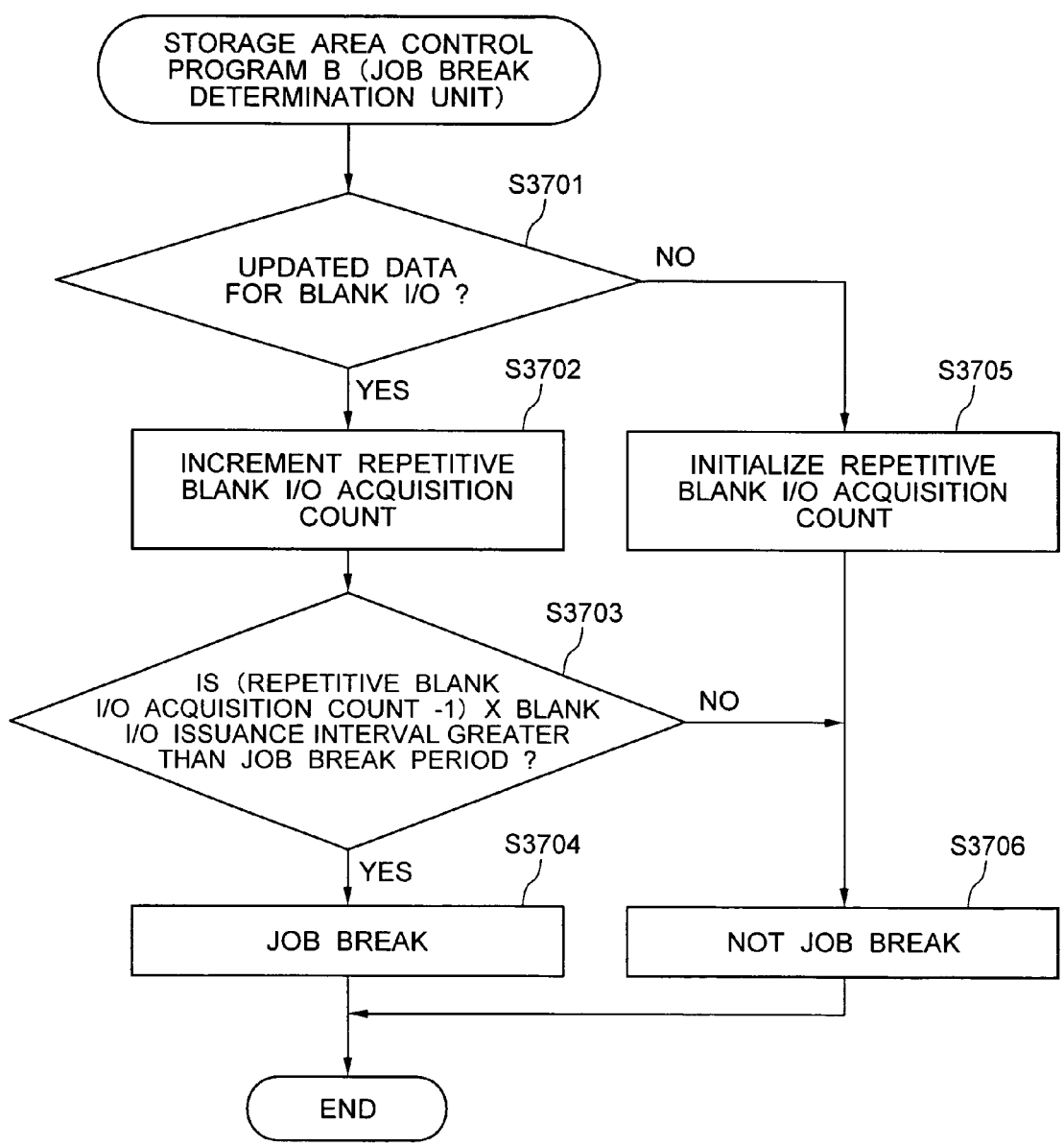
FIG. 37 is a flowchart showing a process for determining whether there is a break between jobs.

The job break determination processing performed at steps S3211, S35202 and S35301 is shown in the flowchart in FIG. 37. Since this processing is substantially the same as the job break determination processing for the first embodiment in FIG. 17, except that the updated data information A 1137 is employed for a determination, no further explanation for the processing will be given.

As described above, according to the storage area control system of this embodiment, when a data copy is to be obtained at a designated time at the same site, the designated time for the acquisition of a data copy can be optimized. Thus, when a failure is encountered, the recovery time required can be reduced, and the reliability of the system can be increased.

The two preferred embodiments for the present invention have been described. However, the present invention is not limited to these embodiments, and is defined in accordance with description of the technical scope included in the claims of the invention.

The invention claimed is:

1. A copy control method for a system that includes a first storage device in which data are stored, a second storage device for obtaining copies of the data, and a host computer for writing the data to the first storage device, comprising the steps of:

obtaining, by the second storage device, blank input/output requests issued at predetermined time intervals if the host computer does not issue an input/output request to the first storage device, and among those times at which the blank input/output requests were sequentially obtained for a predetermined period of time, selecting, by the second storage device, a time, closest to a predetermined data copy acquisition time, that is a target time for acquisition of a copy of the data, to determine that the time thus selected is a time to be a copy execution time for the acquisition of a copy of the data.

2. A copy control method for a system that includes a first storage device in which data are stored, a second storage device for obtaining copies of the data, and a host computer for writing the data to the first storage device, comprising the steps of:

obtaining, by the second storage device, a predetermined data copy acquisition time which is a target time for acquisition of a copy of the data, and a data copy start time and a data copy end time which are designated to have a predetermined time width sandwiching the predetermined data copy acquisition time;

obtaining, by the second storage device, blank input/output requests issued at predetermined time intervals if the host computer does not issue an input/output request to the first storage device;

setting, by the second storage device, as a temporary data copy execution time, a time, between the data copy start time and the data copy acquisition time, at which the blank input/output requests were sequentially obtained for a predetermined period of time; and comparing, by the second storage device, with the temporary data copy execution time, the time, between the data copy acquisition time and the data copy end time, at which the blank input/output requests were sequentially obtained for a predetermined period of time, to determine that the time closest to the data copy acquisition time is a copy execution time for the acquisition of a copy of the data.

3. A copy control method for a system that includes a first storage device in which data are stored, a second storage device for obtaining copies of the data, and a host computer for writing the data to the first storage device, comprising the steps of:

obtaining, by the second storage device, a data copy start time and a data copy end time;

obtaining, by the second storage device, blank input/output requests issued at predetermined time intervals if the host computer does not issue an input/output request to the first storage device, and storing, by the second storage device, a copy of the data that is present at a time, between the data copy start time and the data copy end time, at which the blank input/output requests were sequentially obtained for a predetermined period of time.

4. A copy control method for a system that includes a first storage device in which data are stored, a second storage device for obtaining copies of the data, and a host computer for writing the data to the first storage device, comprising the steps of:

obtaining, by the second storage device, a predetermined data copy acquisition time which is a target time for the acquisition of a copy of the data, and a data copy start time and a data copy end time that are designated to have a predetermined time width sandwiching the predetermined data copy acquisition time;

storing, by the second storage device, in a journal area of the second storage device, updated data that are updated contents of the data obtained from the first storage device;

as a temporary data copy execution time, designating, by the second storage device, a time, between the data copy start time and the data copy acquisition time, at which blank input/output requests to be issued at predetermined intervals if the host computer does not issue an input/output request to the first storage device, were sequentially obtained for a predetermined period of time, copying the updated data stored in the journal area into a copy area of the second storage device, and storing the updated data as the data that are to be used at the temporary data copy execution time;

comparing, by the second storage device, with the temporary data copy execution time, predetermined times, between the data copy acquisition time and the data copy end time, at which the blank input/output requests were sequentially obtained for a predetermined period of time, to determine a time closest to the data copy acquisition time is a copy execution time for the acquisition of a copy of the data;

if the time, between the data copy acquisition time and the data copy end time, at which the blank input/output requests were obtained sequentially for a period of time, is the closest to the data copy acquisition time, at the particular time, copying to the copy area, by the second storage device, the updated data stored in the journal area, and updating the data in the copy area; and storing, by the second storage device, in a designated time copy area of the second storage device, the data in the copy area that is present at the copy execution time thus determined.

5. A copy control method for a system that includes a first storage device in which data are stored, a second storage device for obtaining copies of the data, and a host computer for writing the data to the first storage device, comprising the steps of:

copying, by the second storage device, to a copy area of the second storage device, updated data that are updated contents of the data obtained from the first storage device, and storing the updated data as the data for the copy area;

obtaining, by the second storage device, a data copy start time and a data copy end time; and storing, by the second storage device, in a designated time copy area of the second storage device, the data in the copy area that is present at a time, between the data copy start time and the data copy end time, at which blank input/output requests which are to be issued at predetermined time intervals if the host computer does not issue an input/output request to the first storage device, were sequentially obtained for a predetermined period of time.

6. The copy control method according to claim 4, wherein, when the second storage device fails to obtain the blank input/output request or the updated data in a period extending from the data copy start time to the data copy end time, the second storage device does not store a copy of the data in the designated time copy area.

7. A copy control method for a system that includes a first storage device in which data are stored, a second storage device for obtaining copies of the data, and a host computer, or writing the data to the first storage device, comprising the steps of:

transmitting, by the first storage device, to the second storage device, updated data that are updated contents of the data obtained from the host computer;

copying, by the second storage device, the obtained updated data to a copy area of the second storage area and storing the updated data as the data for the copy area;

transmitting, by the host computer or the first storage device, to the second storage device, blank input/output requests that are issued at predetermined intervals if an input/output request for transmission to the first storage device is not generated;

from among those times at which the blank input/output requests were sequentially obtained for a predetermined period of time, selecting, by the second storage device, a time closest to a predetermined data copy acquisition time, that is a target time for acquisition of a copy of the data, and determining that the time thus selected is the time to be a copy execution time for the acquisition of a copy of the data; and storing, by the second storage device, in a designated time copy area of the second storage area, the data in the copy area that is present at the copy execution time thus determined.

8. A copy control method for a system that includes a first storage device in which data are stored, a second storage device for obtaining copies of the data, and a host computer for writing the data to the first storage device, comprising the steps of:

transmitting, by the first storage device, to the second storage device updated data that are updated contents of the data obtained from the host computer;

copying, by the second storage device, the obtained updated data to a journal area of the second storage area;

obtaining, by the second storage device, a predetermined data copy acquisition time, which is a target time for the acquisition of a copy of the data, and a data copy start time and a data copy end time that are designated to have a predetermined time width sandwiching the predetermined data copy acquisition time;

transmitting, by the host computer or the first storage device, to the second storage device blank input/output requests that are issued at predetermined intervals if an input/output request for transmission to the first storage device is not generated;

as a temporary data copy execution time, designating, by the second storage device, a time, between the data copy start time and the data copy acquisition time, at which the blank input/output requests were sequentially obtained for a predetermined period of time, copying in a copy area the updated data stored in the journal area, and storing the updated data as the data for the copy area;

comparing, by the second storage device, with the temporary data copy execution time, predetermined times between the data copy acquisition time and the data copy end time at which the blank input/output requests were sequentially obtained for a predetermined period of time, and determining that a time closest to the data copy acquisition time is a copy execution time for the acquisition of a copy of the data;

when the time, between the data copy acquisition time and the data copy end time, at which the blank input/output requests were sequentially obtained for a period of time, is the closest to the data copy acquisition time, at the particular time, copying, by the second storage device, to the copy area the updated data stored in the journal area and updating the data in the copy area; and storing, by the second storage device, in a designated time copy area the data in the copy area that is present at the copy execution time thus determined.

9. A copy control method for a system that includes a first storage device in which data are stored, a second storage device for obtaining copies of the data, and a host computer for writing the data to the first storage device, comprising the steps of:

transmitting, by the first storage device, to the second storage device, updated data that are updated contents of the data;

copying, by the second storage device, the obtained updated data to a copy area of the second storage device, and storing the updated data as the data for the copy area;

obtaining, by the second storage device, a data copy start time and a data copy end time;

transmitting, by the host computer or the first storage device, to the second storage device, blank input/output requests that are issued at predetermined intervals if an input/output request for transmission to the first storage device is not generated; and if the blank input/output requests are sequentially obtained for a predetermined period, during a period from the data copy time to the data copy end time, storing, by the second storage device, in a designated time copy area of the second storage device, the data in the copy area that is present at the particular time.

10. The copy control method according to claim 8, wherein, if the second storage device fails to obtain the blank input/output request or the updated data in a period extending from the data copy start time to the data copy end time, the second storage device does not store a copy of the data in the designated time copy area.

11. The copy control method according to claim 9, wherein, if the second storage device fails to obtain the blank input/output request or the updated data in a period extending from the data copy start time to the data copy end time, the second storage device does not store a copy of the data in the designated time copy area.

12. A storage device for obtaining and storing a copy of data for a host computer that is stored in a first storage device, comprising:

an input unit for obtaining, if the host computer does not issue an input/output request to a first storage device, at least a blank input/output request issued at a predetermined time interval; and an operating unit for selecting, among those times at which the blank input/output requests were sequentially obtained for a predetermined period of time, a time, closest to a predetermined data copy acquisition time, that is a target time for the acquisition of a copy of the data, to determine that the time thus selected is the time to be a copy execution time for acquisition of a copy of the data.

13. A storage device for obtaining and storing a copy of data for a host computer that is stored in a first storage device, comprising:

an input unit for obtaining at least a predetermined data copy acquisition time, which is a target time for the acquisition of a copy of the data, and a data copy start time and a data copy end time which are designated to have a predetermined time width sandwiching the predetermined data copy acquisition time, and blank input/output requests issued at predetermined time intervals if the host computer does not issue an input/output request to the first storage device; and an operating unit for setting, as a temporary data copy execution time, a time between the data copy start time and the data copy acquisition time at which the blank input/output requests were sequentially obtained for a predetermined period of time, and comparing, with the temporary data copy execution time, the time between the data copy acquisition time and the data copy end time at which the blank input/output requests were sequentially obtained for a predetermined period of time, to determine that the time closest to the data copy acquisition time is a copy execution time for acquisition of a copy of the data.

14. A storage device for obtaining and storing a copy of data for a host computer that is stored in a first storage device, comprising:

an input unit for obtaining at least a data copy start time and a data copy end time, and blank input/output requests issued at predetermined time intervals if the host computer does not issue an input/output request to the first storage device; and an operating unit for storing a copy of the data that is present at a time, between the data copy start time and the data copy end time, at which the blank input/output requests were sequentially obtained for a predetermined period of time.

15. A storage device for obtaining and storing a copy of data for a host computer that is stored in a first storage device, comprising:

a storage unit including a journal area for storing updated data that are updated contents of the data obtained from the first storage device, a copy area for storing the data, and a designated time copy area for storing the data used for the acquisition of a copy of the data at a copy execution time;

an input unit for obtaining a predetermined data copy acquisition time that is a target time for obtaining a copy of the data, a data copy start time and a data copy end time that are designated to have a predetermined time width sandwiching the data copy acquisition time, blank input/output requests that are to be issued at predetermined time intervals if the host computer does not generate an input/output request for the first storage device, and the updated data; and an operating unit for designating, as a temporary data copy execution time, a time, between the data copy start time and the data copy acquisition time, at which the blank input/output requests were sequentially obtained for a predetermined period of time, copying the updated data stored in the journal area into a copy area and storing the updated data as the data for the copy area; for comparing, with the temporary data copy execution time, predetermined times between the data copy acquisition time and the data copy end time at which the blank input/output requests were sequentially obtained for a predetermined period of time, and determining a time closest to the data copy acquisition time is a copy execution time for the acquisition of a copy of the data; for, if the time, between the data copy acquisition time and the data copy end time, at which the blank input/output requests were obtained sequentially for a period of time, is the closest to the data copy acquisition time, at the particular time, copying to the copy area, the updated data stored in the journal area, and updating the data in the copy area; and storing in the designated time copy area the data in the copy area that is present at the copy execution time thus determined.

16. A storage device for obtaining and storing a copy of data for a host computer that is stored in a first storage device, comprising:
   a storage unit including a copy area to store the data, and a designated time copy area to store the data present at a copy execution time for acquisition of a copy of the data;
   an input unit for storing updated data that are updated contents of the data obtained from the first storage device, a data copy start time and a data copy end time, and blank input/output requests that are issued at predetermined time intervals if an input/output request for the first storage device is not generated by the host computer;
   an operating unit for copying the updated data to the copy area and storing the updated data as the data for the copy area, and for storing, in a designated time copy area of the second storage device, the data in the copy area that is present at a time, between the data copy start time and the data copy end time, at which the blank input/output requests were sequentially obtained for a predetermined period of time.

17. The storage device according to claim 15, wherein when the operating unit fails to obtain the blank input/output request or the updated data in a period extending from the data copy start time to the data copy end time, the second storage device does not store a copy of the data in the designated time copy area.

18. The storage device according to claim 16, wherein when the operating unit fails to obtain the blank input/output request or the updated data in a period extending from the data copy start time to the data copy end time, the second storage device does not store a copy of the data in the designated time copy area.

* * * * *